United States Patent
Wu et al.

(10) Patent No.: US 11,972,285 B2
(45) Date of Patent: Apr. 30, 2024

(54) INTERRUPT REQUEST PROCESSING METHOD AND APPARATUS, AND VIRTUALIZED DEVICE

(71) Applicant: HUAWEI TECHNOLOGIES CO.,LTD., Guangdong (CN)

(72) Inventors: Qixuan Wu, Shenzhen (CN); Lei Dai, Shenzhen (CN); Shanxi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 16/719,282

(22) Filed: Dec. 18, 2019

(65) Prior Publication Data

US 2020/0125397 A1    Apr. 23, 2020

Related U.S. Application Data

(63) Continuation of application No. PCT/CN2018/092933, filed on Jun. 26, 2018.

(30) Foreign Application Priority Data

Jun. 27, 2017 (CN) .......................... 201710497931.0

(51) Int. Cl.
*G06F 9/48*     (2006.01)
*G06F 9/455*    (2018.01)

(52) U.S. Cl.
CPC ........ *G06F 9/4812* (2013.01); *G06F 9/45558* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| | | |
|---|---|---|
| 9,298,504 B1 | 3/2016 | Vincent |
| 2005/0080965 A1 | 4/2005 | Bennett et al. |
| | (Continued) | |

FOREIGN PATENT DOCUMENTS

| | | |
|---|---|---|
| CN | 101135997 A | 3/2008 |
| CN | 101271436 A | 9/2008 |
| | (Continued) | |

OTHER PUBLICATIONS

Cheng et al., "Offloading Interrupt Load Balancing from SMP Virtual Machines to the Hypervisor," total 13 pages (2016).

(Continued)

*Primary Examiner* — Lewis A Bullock, Jr.
*Assistant Examiner* — Melissa A Headly
(74) *Attorney, Agent, or Firm* — Leydig, Voit & Mayer, Ltd.

(57) ABSTRACT

This application provides a virtualized device, and an interrupt processing method running on the virtualized device. The method includes: performing, by a processor, the following operations in a guest mode: receiving, by the processor, an interrupt request from hardware; determining, by the processor, a processing entity of the received interrupt request based on a correspondence between the interrupt request and the processing entity; and when the processing entity of the received interrupt request includes the virtual processor currently running on the processor, determining, by the processor based on a correspondence between the interrupt request and an interrupt service routine, the interrupt service routine corresponding to the received interrupt request, and invoking the interrupt service routine to process the interrupt request. In this manner, trap-in and trap-out of a processor can be avoided for an application interrupt request, thereby reducing a processing delay of the application interrupt request.

17 Claims, 15 Drawing Sheets

(56) References Cited

U.S. PATENT DOCUMENTS

| | | | |
|---|---|---|---|
| 2010/0191889 A1* | 7/2010 | Serebrin | G06F 9/4812 718/1 |
| 2013/0042242 A1* | 2/2013 | Kagan | G06F 9/4812 718/1 |
| 2013/0054860 A1 | 2/2013 | Tsirkin et al. | |
| 2013/0185738 A1 | 7/2013 | Farrell et al. | |
| 2013/0275638 A1 | 10/2013 | Serebrin et al. | |
| 2015/0220464 A1 | 8/2015 | Heisswolf et al. | |
| 2016/0077848 A1* | 3/2016 | Tu | G06F 9/45558 718/1 |
| 2016/0117190 A1* | 4/2016 | Sankaran | G06F 13/24 710/267 |
| 2016/0259664 A1 | 9/2016 | Guan et al. | |
| 2016/0364260 A1 | 12/2016 | Shin | |
| 2017/0206177 A1* | 7/2017 | Tsai | G06F 9/45558 |

FOREIGN PATENT DOCUMENTS

| | | |
|---|---|---|
| CN | 101436966 A | 5/2009 |
| CN | 101561764 A | 10/2009 |
| CN | 101620551 A | 1/2010 |
| CN | 102792272 A | 11/2012 |
| CN | 102945186 A | 2/2013 |
| CN | 106095578 A | 11/2016 |
| EP | 1804164 A1 | 7/2007 |
| EP | 3147784 A1 | 3/2017 |
| TW | 540510 B | 7/2016 |

OTHER PUBLICATIONS

Yang Fang et al., "Research of interrupt system resource conflict detection technology for embedded software," Computer Engineering and Design, total 4 pages (2010). With English abstract.

Tu et al., "A Comprehensive Implementation and Evaluation of Direct Interrupt Delivery," VEE '15: Proceedings of the 11th ACM SIGPLAN/SIGOPS International Conference on Virtual Execution Environments, vol. 50, No. 7, pp. 1-15, XP058493238, ISSN: 0362-1340, DOI:10.1145/2817817.27311, ACM SIGPLAN Notices, Association for Computing Machinery, New York, NY, US (Mar. 14-15, 2015).

EP/23165232.2, Office Action, dated Oct. 11, 2023.

* cited by examiner

INTERRUPT REQUEST PROCESSING METHOD AND APPARATUS, AND VIRTUALIZED DEVICE

CROSS-REFERENCE TO RELATED APPLICATIONS

This application is a continuation of International Application No. PCT/CN2018/092933, filed on Jun. 26, 2018, which claims priority to China Patent 201710497931.0, filed on Jun. 27, 2017. The disclosures of the aforementioned applications are hereby incorporated by reference in their entireties.

TECHNICAL FIELD

Embodiments of the present invention relate to computer technologies, and in particular, to an in-computer interrupt request processing method, a virtualized device, and the like.

BACKGROUND

In a virtualization technology, specific software layers, including a host layer and a virtual computer layer, are added for a physical computer, to implement "virtualization" and "isolation" for hardware of the physical computer. Each software layer includes different running statuses, such as a user mode and a kernel mode. Processing steps for some requirement in the physical computer increase due to diversity of software layers and running statuses, thereby increasing a processing delay for these requirements.

Interrupt processing is a key requirement of a virtualized device. In an existing interrupt processing procedure (a physical interrupt processing procedure) for a virtualized device, an interrupt request generated by hardware (such as a network interface card, a keyboard, or a mouse) is sent to a processor. Then the processor invokes an interrupt processing module in a host to distribute the interrupt request. When the interrupt request needs to be processed by an interrupt service routine in a virtual computer, the interrupt processing module further distributes the interrupt request to the virtual computer. Such cross over software layers and possible switching between different running statuses therein increase a processing delay for such an interrupt request. Particularly, when various applications for implementing services are deployed on the virtual computer, interrupt service routines of these applications are all deployed on the virtual computer. The interrupt processing procedure is actually a part of a service processing procedure. Therefore, such an increase in the delay causes an increase in a service processing delay.

SUMMARY

This application provides an interrupt request processing method and apparatus, a virtualized device, and the like, to reduce a processing delay of an application interrupt request on a virtualized device, and further accelerate service processing.

According to a first aspect, this application provides a virtualized device. The virtualized device includes a hardware layer, a host running at the hardware layer, and a virtual computer running on the host. The virtual computer includes one or more virtual processors serving the virtual computer.

The host is configured to configure the virtual processor of the virtual computer to be able to receive an interrupt request from the hardware layer. This is implemented by modifying a register bit. Specifically, the host enables, by modifying a register bit that is in a register and that is used to indicate an interrupt receiving mode of the virtual processor, the virtual processor to directly receive all interrupt requests from the hardware layer in a guest mode. The interrupt receiving mode of the virtual processor is indicated by one or more register bits. The register is a physical register associated with a physical processor that runs the virtual processor. Therefore, the physical register needs to be finally modified in this configuration step.

The virtual computer (which may be a "current virtual processor" in the following) is configured to receive an interrupt request from the hardware layer, and determine a processing entity of the received interrupt request based on the interrupt request information. When the processing entity of the received interrupt request includes the current virtual processor of the virtual computer, the virtual computer determines, based on the interrupt request, an interrupt service routine (specifically, an address of the interrupt service routine) corresponding to the received interrupt request, and invokes the interrupt service routine to process the interrupt request. Specifically, the received interrupt request may carry an identifier of the interrupt request, for example, an IRQ ID. The processing entity and the interrupt service routine are subsequently determined based on the identifier.

It should be noted that performing an action by the virtual computer (such as a virtual machine or a libOS) in the virtualized device may be understood as that a virtual processor serving the virtual computer performs the action. Therefore, "the current virtual processor of the virtual computer" may be understood as a virtual processor that is performing the foregoing configuration after the foregoing configuration starts to run. In addition, the "processing entity" of the interrupt request in this application may be the one or more virtual processors, or may be the host. Certainly, these two types of processing entities are essentially physical processors, and are physical processors in different modes.

Specifically, the virtual computer determines the processing entity of the interrupt request and the interrupt service routine based on some information and the interrupt request. The information includes a correspondence between (an identifier of) the interrupt request, the processing entity, and (an address of) the interrupt service routine. The information is stored in a storage area, such as guest address space, that can be accessed by a virtual processor that is to use the information. In this way, the virtual processor can directly access the information without trapping out. The correspondence may be updated by the host. To facilitate information management and save storage space, the information may be stored in a storage area accessible to all virtual processors of a plurality of VMs, so that the information can be easily accessed by any virtual processor. Further, the host may also access the information, because the host may update the information.

It can be learned that, in such a virtualized device, the virtual computer may directly receive all interrupt requests from the hardware layer, and distribute the interrupt requests. When the processing entity of the interrupt request includes the current virtual processor of the virtual computer, the interrupt request may be directly processed by the virtual computer. If an interrupt request is an application interrupt request, and a processing entity of the interrupt request includes the current virtual processor of the virtual computer, the virtual computer may directly process the interrupt request. This avoids trap-in and trap-out of the virtual computer, prevents an interrupt processing procedure from crossing a plurality of layers of the virtualized device, and reduces a processing delay of the application interrupt request. Certainly, this also reduces a processing delay of a guest operating system interrupt request.

With reference to the first aspect, in a first implementation, when the virtual computer determines that the processing entity of the received interrupt request is another virtual processor that does not include the current virtual processor of the virtual computer, the virtual computer determines whether the another virtual processor is in service. If the another virtual processor is in service, the virtual computer operates a physical interrupt controller to send an IPI interrupt request to one or more in-service virtual processors of the another virtual processor, where the IPI interrupt request carries the identifier of the received interrupt request. A precondition for performing this operation is that the host configures an interrupt controller operation mode for the virtual processor, so that the virtual processor can operate the physical interrupt controller without trapping out. After receiving the IPI, an in-service virtual processor executes an interrupt service routine corresponding to the IPI. A specific implementation of the interrupt service routine is invoking an interrupt service routine corresponding to the identifier that is of the interrupt request and that is carried in the IPI.

The "another virtual processor" herein may be a virtual processor serving the virtual computer, or may be a virtual processor serving another virtual computer. Similar to the interrupt receiving mode, the interrupt controller operation mode of the virtual processor is indicated by one or more bits of the register associated with the physical processor that runs the virtual processor.

To facilitate management and save space, all information about whether a virtual processor is in an in-service or out-of-service state may be stored in the storage area accessible to all the virtual processors, so as to be accessed by any virtual processor. Further, the information may be accessed by the host, because the host may modify a status of a virtual processor when swapping in or swapping out the virtual processor. When a virtual processor sends an IPI interrupt request to another virtual processor, the virtual processor needs to know a physical processor that runs the another virtual processor. Information (such as a CORE ID in the following embodiment) about a physical processor that runs a virtual processor may also be stored in a manner similar to that of storing the status information. The information may also be used in the following solution depending on whether a virtual processor is in service or out of service or the following solution in which an IPI is sent.

It can be learned that, if the current virtual processor of the virtual computer receives an interrupt request but the current virtual processor is not a processing entity of the interrupt request, and a virtual processor that can process the interrupt request is in service, the current virtual processor directly sends, by using an IPI interrupt without trapping out, the interrupt request that cannot be processed by the current virtual processor to the in-service virtual process that can process the interrupt request. This saves a time during which the current virtual processor traps out, and then the host forwards the interrupt request, so that another virtual processor can receive and process the interrupt request as soon as possible. This further reduces a processing delay of an application interrupt request. For more specific implementation methods, refer to a sixth aspect and implementations of the sixth aspect.

With reference to the first aspect or the first implementation of the first aspect, in a second implementation, the virtual computer is further configured to: when the processing entity of the received interrupt request is the another virtual processor that does not include the current virtual processor of the virtual computer, and it is determined that none of the another virtual processor is in service, determine a target virtual processor from the another virtual processor, and record the identifier of the received interrupt request in a storage area accessible to both the current virtual processor and the host. Certainly, when the identifier is recorded herein, a relationship needs to be established between the identifier and the target virtual processor, so as to indicate that the interrupt request is to be processed by the target virtual processor.

In this application, a storage area accessible to both A and B may be specifically a shared memory that can be accessed by both A and B, or may be another type of storage space that can be accessed by A and B.

Correspondingly, the host is further configured to: after the target virtual processor is swapped in, send an interrupt request to the target virtual processor based on the identifier recorded in the storage area, so that the target virtual processor processes the interrupt request after trapping in. Specifically, after any virtual processor in the processing entity is swapped in by the host and before the virtual processor traps in, the host checks the storage area and finds that the virtual processor has an unprocessed interrupt request. Therefore, the host sends, to the swapped-in virtual processor, the interrupt request that has a same characteristic as the received interrupt request (actually, the interrupt request is sent to a physical processor to which the virtual processor is scheduled). The swapped-in virtual processor receives and processes the interrupt request after trapping in.

The interrupt request that has a same characteristic may be an interrupt request that has a same identifier as the initially received interrupt request, or may be an IPI interrupt that carries the identifier of the initially received interrupt request.

The "target virtual processor" herein may be all processing entities of the interrupt request. Therefore, it may be understood that the determining a target virtual processor and then recording the identifier herein includes such a specific implementation: directly recording the identifier of the interrupt request for all the processing entities of the interrupt request.

It can be learned that, if the current virtual processor of the virtual computer receives an interrupt request but the current virtual processor is not a processing entity of the interrupt request, and a target virtual processor that can process the interrupt request is out of service, the virtual computer records the identifier of the interrupt request in the storage area accessible to both the current virtual processor and the host, so that after swapping in the target virtual processor, the host can send, by accessing the storage area, a same interrupt request to the target virtual processor for processing. The target virtual processor can process the interrupt request after trapping in. This implements interrupt request sharing between a plurality of virtual processors while the current virtual processor does not trap out, and further reduces a processing delay of an interrupt request.

Further, for an interrupt request that needs to be processed only by one virtual processor, after sending the interrupt request once, the host may clear a corresponding record of another processing entity. This can prevent the interrupt request from being repeatedly processed by a plurality of virtual processors.

With reference to the second implementation of the first aspect, in a third implementation, the host is further configured to set a priority of the interrupt request, and record the priority in a storage area accessible to both the host and the virtual computer. In the aspect of determining a target virtual processor from the another virtual processor, the virtual computer is specifically configured to determine the target virtual processor based on the priority of the received interrupt request and a priority of the virtual processor, where statuses and priorities of all virtual processors are stored in a storage area accessible to all virtual computers.

The priority of the virtual processor is a priority of a current task on the virtual processor. The current task is not running when the virtual processor is out of service, and is running when the virtual processor is in service.

To facilitate information management, the priority of the interrupt request may be stored in the same storage area as the information, such as the interrupt service routine, mentioned in the foregoing implementation; and the priority of the virtual processor may be stored in the same storage area as the status of the virtual processor mentioned in the foregoing implementation.

The interrupt priority is introduced, and then the interrupt priority is compared with the priority of the current task on the virtual processor to select a proper target virtual processor. This avoids relatively great impact on the current task on the virtual processor.

With reference to the third implementation of the first aspect, in a fourth implementation, the virtual computer searches, based on the identifier of the received interrupt request, the storage area accessible to both the host and the virtual computer, to obtain the priority of the received interrupt request; compares the priority of the received interrupt request with priorities of all in-service virtual processors; and if the priorities of all the in-service virtual processors are higher than (or equal to) the priority of the received interrupt request, determines all virtual processors included in the processing entity of the received interrupt request as the target virtual processor; or if a priority of one or more in-service virtual processors is lower than the priority of the received interrupt request, determines a virtual processor with a highest priority among all virtual processors included in the processing entity of the received interrupt request as the target virtual processor.

With reference to the fourth implementation of the first aspect, in a fifth implementation, if a priority of one or more in-service virtual processors is lower than the priority of the received interrupt request, the virtual computer is further configured to determine a virtual processor with a lowest priority among all the in-service virtual processors as a transit virtual processor, and send an IPI interrupt request to the transit virtual processor, where the IPI interrupt request carries an identifier of the target virtual processor, so that the transit virtual processor traps out according to the IPI interrupt request; and the host is further configured to swap in the target virtual processor after the transit virtual processor traps out. For more specific implementation methods, refer to a sixth aspect and implementations of the sixth aspect.

If the current virtual processor is the virtual processor with the lowest priority, the current virtual processor sends the identifier of the target virtual processor to the host, and then traps out. In other words, no IPI interrupt request needs to be sent, and the current virtual processor is the "transit virtual processor" to be swapped out.

In other words, if the priority of the interrupt request is lowest, only the identifier of the interrupt request is recorded, and swap-in of the target virtual processor does not need to be actively triggered; or if a priority of an in-service virtual processor is lower than the priority of the interrupt request, it indicates that the interrupt request may be processed in prior to a current task of the virtual processor, and the virtual processor may be swapped out. A virtual processor with a lowest priority is determined from virtual processors that can be swapped out and is used as a transit processor. A virtual processor with a highest priority is determined from the processing entity of the interrupt request and is used as a target virtual processor. Then the target virtual processor is swapped in, and the transit virtual processor is swapped out. This minimizes impact on the current task of the virtual processor. The "lowest" or "highest" herein is merely an implementation of this application. For example, if a system allows, a corresponding virtual processor with a second-lowest or second-highest priority may alternatively be selected.

With reference to the second implementation of the first aspect, in a sixth implementation, when the processing entity of the received interrupt request is the another virtual processor that does not include the current virtual processor of the virtual computer, and it is determined that none of the another virtual processor is in service, the virtual computer is further configured to send an identifier of the target virtual processor to the host, and trap out the target virtual processor, where the target virtual processor is any virtual processor in the processing entity or a virtual processor with a highest priority in the processing entity; and the host is further configured to swap in the target virtual processor based on the identifier of the target virtual processor, and swap out the current virtual processor of the virtual computer.

For example, sometimes, an interrupt request is very urgent, or has a very high priority when a priority is defined, and the interrupt request needs to be immediately processed. Therefore, no transit virtual processor needs to be determined, a current virtual processor is directly swapped out, and any processing entity or a processing entity with a highest priority is swapped in, so as to process the interrupt request as soon as possible.

In some other implementations, in a manner of actively swapping in the target virtual processor, the identifier of the interrupt request may not be recorded in advance; instead, the identifier of the interrupt request is carried in an event or a message used to trigger swap-in of the target virtual processor. For example, the IPI interrupt request in the foregoing fifth implementation further carries the identifier of the interrupt request in addition to the identifier of the target virtual processor. The transit virtual processor sends the identifier of the interrupt request to the host when trapping out. After swapping in the target virtual processor, the host sends a same interrupt request to the target virtual processor based on the identifier.

With reference to any one of the foregoing implementations of the first aspect, in some implementations, the virtualized device stores, in the storage area accessible to all the virtual processors (namely, all virtual machines), the information about whether a virtual processor is in an in-service or out-of-service state. Specifically, the information may be recorded by using one or more tables. For ease of description, the record is referred to as a "running entity table" in some embodiments of this application. However, a name of the table is not limited in this application. Likewise, a name of an "interrupt vector table" or an "interrupt mapping table" appearing in the following implementations is not limited in this application either.

With reference to any one of the foregoing implementations of the first aspect, in some implementations, scheduling of a virtual processor is performed by the host, and specifically, may be performed by a virtual machine monitoring apparatus in the host. An update of the running entity table is performed by the host. This means that the host can also access a storage area of the running entity table. Specifically, after the host swaps in a virtual processor and before the virtual processor traps in, a corresponding status of the virtual processor in the running entity table is updated to in-service, and then the virtual processor traps in. After a virtual processor traps out and before the host swaps out the virtual processor, a corresponding status of the virtual processor in the running entity table is updated to out-of-service, and then the host swaps out the virtual processor.

A latest status of a virtual processor can be obtained in a timely manner by using the running entity table that can be accessed by all the virtual processors and the host. If a processing entity of an interrupt request is in service, a current virtual processor may directly send the interrupt request to the in-service virtual processor without trapping out; or if none of processing entities of an interrupt request is in service, a current virtual processor may record the interrupt request in the running entity table, or further trigger trap-in of a target virtual processor, or the like, without trapping out. In this way, the target virtual processor may process the interrupt request after trapping in. This avoids a delay caused by trap-in and trap-out of the virtual processor, and improves processing efficiency of the interrupt request.

With reference to any one of the first aspect or the foregoing implementations of the first aspect, in a seventh implementation, interrupt affinity of the interrupt controller needs to be modified, to avoid, to a greatest extent, a case in which a virtual processor receiving the interrupt request is not a processing entity of the interrupt request, so as to further reduce an interrupt processing delay. The interrupt affinity is an attribute of the interrupt controller. The interrupt affinity includes a correspondence between an identifier of an interrupt request and an identifier of a physical processor (or referred to as a processor in this application). The interrupt controller is a piece of hardware, configured to receive an interrupt request generated by other hardware, and send an interrupt request to a corresponding physical processor based on the interrupt affinity. Correspondingly, the host is further configured to configure the interrupt affinity of the interrupt controller, so that an interrupt request can be sent to a virtual processor included in a processing entity of the interrupt request. Because a virtual processor runs on a physical processor, ensuring that an interrupt request is sent to a correct virtual processor is actually ensuring that the interrupt request is sent to a physical processor that runs the correct virtual processor.

With reference to the seventh implementation of the first aspect, in an eighth implementation, after a virtual processor is swapped in and before the virtual processor traps in, the host establishes, in the interrupt affinity, a correspondence between a physical processor that is to run the swapped-in virtual processor and all interrupt requests whose processing entity includes the swapped-in virtual processor. Then the virtual processor traps in and runs.

In this way, the interrupt controller can send, based on the modified interrupt affinity, an interrupt request to the physical processor that runs the virtual processor, in other words, send the interrupt request to the virtual processor. A processing entity of the interrupt request includes the virtual processor, and the virtual processor may directly process the interrupt request. This effectively avoids distribution of the interrupt request between virtual processors.

Correspondingly, before swapping out a virtual processor, (in addition to updating the running entity table) the host deletes, from the interrupt affinity, a correspondence between the to-be-swapped-out virtual processor and all interrupt requests whose processing entity includes the virtual processor.

After the interrupt affinity of the interrupt controller is configured, an interrupt request is most likely to be sent to a virtual processor that is currently in service and that can process the interrupt request. This greatly avoids distribution of the interrupt request between virtual processors, and further improves processing efficiency of the interrupt request.

With reference to the seventh or eighth implementation of the first aspect, in a ninth implementation, even if the interrupt affinity is configured, a virtual processor may still receive an interrupt request that the virtual processor cannot process. In this case, because the interrupt affinity is configured, it may be determined that none of virtual processors included in a processing entity of the interrupt request is in service, and therefore it does not need to be determined whether the processing entity of the interrupt request is in service. For another implementation, refer to the foregoing second, third, fourth, fifth, or sixth implementation. For a corresponding effect, also refer to that of the foregoing implementations. For example, a target virtual processor (which may include all processing entities) of a to-be-processed interrupt request is determined from a processing entity of the interrupt request. Then, only an identifier of the interrupt request is recorded for the target virtual processor. Alternatively, a target virtual processor may be properly selected based on a priority of an interrupt request. Further, swap-in of the target virtual processor may be actively triggered, so that the interrupt request is processed as soon as possible.

With reference to any one of the first aspect or the foregoing implementations of the first aspect, in some implementations, the virtual computer is further configured to: when the processing entity of the received interrupt request is the host, inject the received interrupt request into the host; and the host is further configured to receive and process the interrupt request injected by the virtual computer.

With reference to any one of the first aspect or the foregoing implementations of the first aspect, in some implementations, the virtual computer is specifically configured to determine, based on the interrupt vector table and the identifier of the received interrupt request, the processing entity of the interrupt request and the interrupt service routine corresponding to the interrupt request. The interrupt vector table includes a correspondence between an identifier of an interrupt request, a processing entity of the interrupt request, and an interrupt service routine of the interrupt request. The interrupt vector table is stored in the storage area accessible to both the virtual computer and the host. The host is further configured to (triggered by the virtual computer) modify the interrupt vector table to add the correspondence between an identifier of an interrupt request, a processing entity of the interrupt request, and an interrupt service routine of the interrupt request.

The cross-layer shared interrupt vector table (to be specific, the interrupt vector table can be shared by a virtual processor and the host) stores information such as a correspondence between an interrupt request, a processing entity of the interrupt request, and an interrupt service routine, so that a virtual processor may directly access a storage area without trapping out when the virtual processor needs to process an interrupt request by using the information. This avoids an interrupt delay caused by trap-out. Storing the information in such a way can save storage space, and further, the host may modify the information. This design is more proper and secure.

According to a second aspect, this application provides an interrupt request processing method. The method is applied to a virtualized device. The virtualized device includes a processor and two running modes: a host mode and a guest mode.

The processor configures a register in a host mode, so that the processor can receive an interrupt request from other hardware of the virtualized device when running a virtual processor that runs in a guest mode.

The processor performs the following operations in the guest mode: receiving, by the processor, an interrupt request from the other hardware; determining, by the processor, a processing entity of the received interrupt request based on the interrupt request; and when the processing entity of the received interrupt request includes a virtual processor currently running on the processor, determining, by the processor based on the interrupt request, an interrupt service routine corresponding to the received interrupt request, and invoking the interrupt service routine to process the interrupt request. Specifically, the received interrupt request may carry an identifier of the interrupt request, for example, an IRQ ID. The processing entity and the interrupt service routine are subsequently determined based on the identifier.

Further, a virtual computer determines the processing entity of the interrupt request and the interrupt service routine based on some information and the interrupt request. The information includes a correspondence between (the identifier of) the interrupt request, the processing entity, and the interrupt service routine.

The "processor" herein may be understood as a smallest physical processing unit, such as a physical core.

With reference to the second aspect, in a first implementation, the processor configures, in the host mode, the virtual processor that is to run on the processor to be able to operate a physical interrupt controller of the virtualized device.

The processor further performs the following operations in the guest mode: when the processing entity of the received interrupt request is another virtual processor that does not include the virtual processor currently running on the processor and it is determined that at least one of the another virtual processor is in service, operating the physical interrupt controller to send an IPI interrupt request to one or more in-service virtual processors of the another virtual processor, where the IPI interrupt request carries the identifier of the received interrupt request.

With reference to the second aspect, in a second implementation, the processor configures interrupt affinity of the interrupt controller of the virtualized device in the host mode, so that an interrupt request can be sent to a virtual processor included in a processing entity of the interrupt request, where the interrupt affinity includes a correspondence between an identifier of an interrupt request and an identifier of a processor. Correspondingly, the processor receives the interrupt request that is sent by the interrupt controller to the processor based on the interrupt affinity.

With reference to the second implementation of the second aspect, in a third implementation, after swapping in a virtual processor in the host mode, the processor establishes, in the interrupt affinity, a correspondence between the processor and all interrupt requests whose processing entity includes the swapped-in virtual processor. Correspondingly, before swapping out a virtual processor in the host mode, the processor deletes, from the interrupt affinity, a correspondence between the to-be-swapped-out virtual processor and all interrupt requests whose processing entity includes the virtual processor.

With reference to the second or third implementation of the second aspect, in a fourth implementation, when the processing entity of the received interrupt request is the another virtual processor that does not include the virtual processor currently running on the processor, the processor determines a target virtual processor from the another virtual processor in the guest mode, and records the identifier of the interrupt request in a storage area that is accessible to the processor in both the guest mode and the host mode. After the target virtual processor is swapped in, the processor sends, in the host mode, an interrupt request to the target virtual processor based on the identifier recorded in the storage area, so that the target virtual processor processes the interrupt request after trapping in.

Specifically, after the target virtual processor is swapped in and before the target virtual processor traps in, the processor disables, in the host mode, an interrupt response of the host mode, and then sends an interrupt request with a same characteristic to the processor based on the identifier recorded in the storage area (because a processor to which the target virtual processor is currently scheduled is the processor itself). After the target virtual processor traps in (in other words, the processor is in the guest mode), the target virtual processor may receive and process the interrupt request.

With reference to the fourth implementation of the second aspect, in a fifth implementation, the processor sets a priority of the interrupt request in the host mode, and records the priority in the storage area that is accessible to the processor in both the host mode and the guest mode; and the processor determines, in the guest mode, the target virtual processor based on the priority of the received interrupt request and a priority of the virtual processor, where the priority of the virtual processor is stored in a storage area accessible to all virtual processors.

With reference to the fourth implementation of the second aspect, in a sixth implementation, when the processing entity of the received interrupt request is the another virtual processor that does not include the virtual processor currently running on the processor, the method further includes: reversely injecting, by the processor, an identifier of the target virtual processor (into the host or the host mode) in the guest mode; then exiting, by the processor, the guest mode, and entering the host mode, where the target virtual processor is any one of the another virtual processor or a virtual processor with a highest priority in the another virtual processor; and swapping in, by the processor in the host mode, the target virtual processor based on the identifier of the target virtual processor, and swapping out the current virtual processor on the processor.

The method provided in the second aspect is applied to the virtualized device. The virtualized device includes a hardware layer, the host running at the hardware layer, and the virtual computer running on the host. The virtual computer includes a virtual processor serving the virtual computer. One virtual processor may run on one processor. That the processor performs an action in the guest mode may be understood as that a virtual processor performs the action (in a guest mode), and further, may be understood as that a virtual computer served by the virtual processor performs the action. That the processor performs an action in the host mode may be understood as that the host performs the action.

For more implementations of the second aspect, refer to the foregoing first aspect.

According to a third aspect, this application provides an interrupt request processing apparatus. The processing apparatus is applied to a virtualized device. The virtualized device includes a hardware layer, a host, and a virtual computer. The processing apparatus includes a host interrupt management unit deployed on the host and a guest interrupt management unit deployed on the virtual computer.

The host interrupt management unit is configured to configure a virtual processor of the virtual computer to be able to receive an interrupt request from the hardware layer.

The guest interrupt management unit is configured to receive an interrupt request from the hardware layer, where the received interrupt request carries an identifier of the interrupt request; and determine a processing entity of the received interrupt request based on the identifier. When the processing entity of the received interrupt request includes a current virtual processor of the virtual computer, the virtual computer determines, based on the identifier, an interrupt service routine corresponding to the received interrupt request, and invokes the interrupt service routine to process the interrupt request.

For more specific implementations, refer to the foregoing first aspect or second aspect.

According to a fourth aspect, this application provides a virtualized device. The virtualized device includes a processor and a memory. The memory is configured to store a computer-readable instruction. The processor is configured to read the computer-readable instruction, and implement any one of the methods provided above.

According to a fifth aspect, this application provides a computer storage medium, configured to store a computer-readable instruction. When the computer-readable instruction is read by a processor, the processor is enabled to implement any one of the methods provided above. In addition, this application further provides a computer program or a computer program product. The computer program or the computer program product includes a computer-readable instruction. When the computer-readable instruction is read by a processor, the processor is enabled to implement any one of the methods provided in the foregoing aspects.

According to a sixth aspect, this application provides an inter-processor interrupt (IPI) processing method. The method may be applied to the method or the apparatus provided in any one of the foregoing aspects or implementations.

A host configures an interrupt controller operation mode for a source virtual processor, so that the source virtual processor is able to operate, without trapping out, an interrupt controller to send an IPI interrupt request to a physical processor that runs a destination virtual processor. The source virtual processor determines, based on information, the physical processor that runs the destination virtual processor, where the information is recorded in a storage area accessible to the source virtual processor, and the information includes information indicating the physical processor that runs the destination virtual processor. Then the source virtual processor operates the interrupt controller to send an IPI interrupt request to the physical processor that runs the destination virtual processor.

In this way, through configuration of the interrupt controller operation mode and by using the information that can be directly accessed, the source virtual processor may send the IPI interrupt request to the destination virtual processor without trapping out.

With reference to the sixth aspect, in a first implementation, the source virtual processor sends the IPI interrupt request to the destination virtual processor, where the IPI interrupt request carries an identifier of another interrupt request, or the IPI interrupt request carries an identifier of another interrupt request and an identifier of a virtual processor. If the destination virtual processor determines that the IPI interrupt request carries no identifier of a virtual processor, or determines that the identifier of the virtual processor carried in the IPI interrupt request is consistent with an identifier of the destination virtual processor, the destination virtual processor invokes an interrupt service routine corresponding to the identifier of the another interrupt request to process the another interrupt request.

In this way, a common interrupt request may be distributed between virtual processors by sending an IPI interrupt request between the virtual processors. These virtual processors may be in a same virtual computer, or may be in different virtual computers.

With reference to the sixth aspect or the first implementation of the sixth aspect, in a second implementation, when the IPI interrupt request carries an identifier of a virtual processor (may not carry an identifier of another interrupt request), the method further includes: if the destination virtual processor determines that the identifier of the virtual processor carried in the IPI interrupt request is inconsistent with an identifier of the destination virtual processor, sending, by the destination virtual processor, the identifier of the virtual processor to the host, and trapping out, so that the host swaps in the virtual processor indicated by the identifier of the virtual processor.

In this way, the host may swap in a target virtual processor by sending an IPI interrupt request between virtual processors, so that the target virtual processor processes an interrupt request carried in the IPI interrupt request as soon as possible.

With reference to any one of the sixth aspect or the implementations of the sixth aspect, in a third implementation, the source virtual processor sends the IPI interrupt request only when determining that the destination virtual processor is in service. Specifically, the source virtual processor queries for the information to determine whether the destination virtual processor is in service. The information further includes information indicating whether the destination virtual processor is in service. Specifically, the information may be recorded in a storage area accessible to both a virtual processor and the host. The host is configured to modify the information when swapping in or swapping out the virtual processor.

According to a seventh aspect, this application further provides an IPI interrupt processing apparatus that is corresponding to the sixth aspect and that includes one or more modules to implement the method provided in any one of the sixth aspect or the implementations of the sixth aspect. In addition, this application further provides a virtualized device. A virtual processor in the virtualized device is configured to implement the method described in any one of the sixth aspect or the implementations of the sixth aspect. In addition, this application further provides a computer storage medium, a computer program, and a computer program product. For details, refer to the foregoing aspects.

According to an eighth aspect, this application further provides an interrupt processing method, used to process an interrupt request that needs to be processed by a plurality of virtual processors, such as a clock interrupt. The method includes: creating, by a host, corresponding information for each physical processor, where the information includes information about a virtual processor that previously runs on the physical processor; and receiving, by a virtual processor, an interrupt request, determining that the interrupt request needs to be processed by a plurality of virtual processors, then determining that a virtual processor in the information set is included in a processing entity of the interrupt request, and then recording the interrupt request in a location, corresponding to the virtual processor, in an area that can be accessed by both the host and the virtual processor, so that swap-in of the virtual processor is triggered, and the virtual processor may process the interrupt request as soon as possible. For more processing methods, refer to the foregoing aspects and the embodiments thereof. In addition, this application further provides an apparatus and a readable storage medium that are corresponding to this aspect. According to the method, a delay of an interrupt request similar to the clock interrupt is also effectively reduced.

According to a ninth aspect, this application further provides an interrupt processing method. A host receives an application interrupt request; determines, by accessing information, whether a virtual processor that can process the interrupt request is in service; and if any virtual processor that can process the interrupt request is in service, sends the interrupt request to the in-service virtual processor by using an IPI interrupt; or if no virtual processor that can process the interrupt request is in service, records the interrupt request in an area that can be accessed by both the host and the virtual processor. For information about whether to actively trigger swap-in and how to perform swap-in, refer to the foregoing aspects and the specific embodiments thereof. In addition, this application further provides an apparatus and a readable storage medium that are corresponding to this aspect. According to the method, this application may be applied to a scenario in which a host cannot disable an interrupt response, and an application scope is wider.

DESCRIPTION OF EMBODIMENTS

Figure 1:
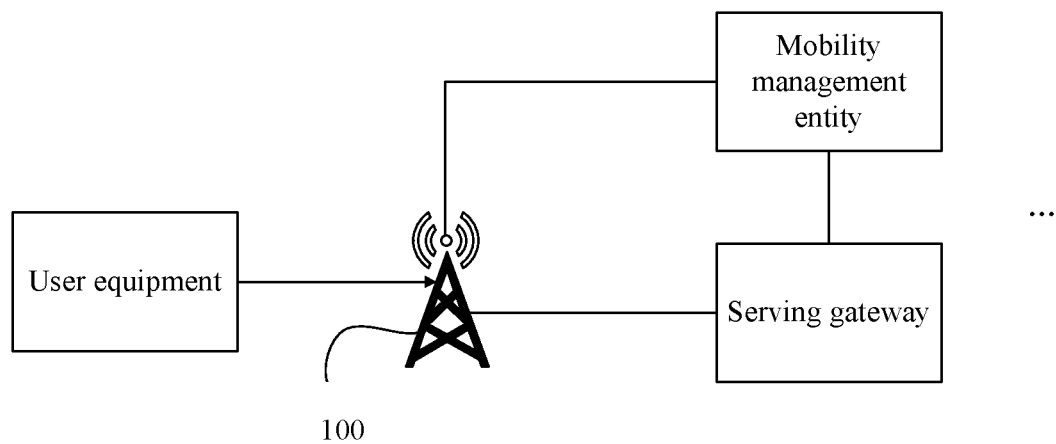
FIG. 1 is a schematic diagram of a network architecture applied to an embodiment of the present invention.

To easily understand the embodiments of the present invention, some elements used in descriptions of the embodiments of the present invention are first described herein.

A virtual computer is a general term for software-virtualized runtime environments on all types of virtualized devices. This concept includes a virtual machine, a container, a light-weight virtual libOS, and the like.

A virtual machine (VM) is one or more virtual computers simulated on one physical computer by using software. The virtual machine runs in a completely isolated environment, and works like a real computer. A guest operating system (guest OS) may be installed on the virtual machine. The guest operating system runs one or more applications. The virtual machine may also access a network resource. An application running on the virtual machine works as if the application works in a real computer.

A host layer is used as a management layer, and is used to manage and allocate a hardware resource, present a virtual hardware platform for a virtual machine, schedule and isolate a virtual machine, and the like. In some implementations, the host layer includes a host operating system and a virtual monitoring apparatus, such as a virtual machine monitor (VMM) or a hypervisor. The virtual monitoring apparatus may be deployed in the host operating system, or may be deployed outside the host operating system. In some other implementations, the "host layer" may further include one privileged virtual machine (such as a virtual architecture Xen). The virtual hardware platform provides virtual computers running on the virtual hardware platform with various hardware resources, such as a virtual processor, a virtual memory, a virtual disk, and a virtual network interface card. The virtual computers run on the virtual hardware platform prepared by the host layer for the virtual computers. In this application, the host layer is sometimes referred to as a host.

A hardware layer is a hardware platform on which a virtual environment runs. The hardware layer may include a plurality of types of hardware. For example, a hardware layer of a physical computer may include a processor and a memory, and may further include an interrupt controller, a network interface card (NIC), an input/output (I/O) device, and the like.

Interrupt request (interrupt request) and interrupt number: An interrupt request is an event generated by hardware. The hardware sends the event to a processor. When receiving the event, the processor suspends a current routine and executes a routine corresponding to the event. That the hardware generates an interrupt request may be triggered by the hardware, or may be triggered by software. The interrupt request is sometimes referred to as an interrupt. Some hardware (such as a network interface card, an audio card, a mouse, and a hard disk) in a computer can complete specific work without intervention of the processor. However, the hardware still needs to periodically interrupt the processor, and require the processor to do some specific work for the hardware. An interrupt number is an identifier of an interrupt request, and is represented by IRQ ID in this application.

An interrupt controller is disposed between a processor and hardware that triggers an interrupt request, and is mainly configured to collect interrupt requests generated by various hardware, and send the interrupt requests to the processor based on a specific priority or according to another rule. For example, the interrupt controller is an advanced programmable interrupt controller (APIC). In this application, the interrupt controller is a general term, and may include different function components. For example, an interrupt controller in an X86 system includes one io-APIC and a plurality of local-APICs, and may further include several other interrupt control components. One local-APIC is corresponding to one physical core.

Interrupt affinity is a correspondence between an interrupt request and a processing entity (usually a physical processing entity, such as a physical core) that processes the interrupt request. An interrupt controller may send, based on the interrupt affinity, an interrupt request to one or more physical processing entities corresponding to the interrupt request.

An interrupt service routine (ISR) is a routine used to process an interrupt request. When receiving an interrupt request, a processor suspends executing a current routine and executes an interrupt service routine corresponding to the interrupt request.

Application interrupt request: The application is an application (or service software) deployed on a virtual machine. The application on the virtual machine deploys an interrupt service routine of the application into a guest operating system in which the application runs. If an interrupt service routine of an interrupt request is in a guest operating system and is deployed by an application (that is, the interrupt service routine needs to be processed by the application), the interrupt request is referred to as an application interrupt request. In most virtualized network devices, an application deployed on a virtual machine is usually used to fulfill various actual service requirements. Therefore, the application interrupt request may be sometimes referred to as a service interrupt request.

A guest operating system interrupt request: An interrupt service routine corresponding to such an interrupt request is provided by a guest operating system of a virtual machine, and is not deployed by an application on the virtual machine. Like an application interrupt request, the interrupt service routine of such an interrupt request is also deployed in a guest operating system of a virtual machine.

A libOS (library operating system) is an operating system provided by a light-weight virtualization technology. The libOS is a runtime library, and can provide a function similar to that of an operating system and run together with an application link, so that all resources required for running of an application are managed by the application instead of an operating system. For example, the libOS may be unikernel, OSv, or dune. The libOS may be considered as a light-weight virtual computer.

A physical processor is sometimes referred to as a "processor". In this application, the physical processor is a physical processing unit, and specifically, may be a smallest processing unit, namely, a physical core in this application. In some embodiments, the physical processor may alternatively be a processing unit including a plurality of physical cores.

A virtual processor represents a physical processing unit provided, in a shared or fragmented manner in a virtualization technology, for a virtual computer to use, such as a virtual CPU (virtual central processing unit, vCPU). One virtual computer may be served by one or more virtual processors. When there are a plurality of virtual processors, usually, one virtual processor is a primary virtual processor, and others are secondary virtual processors.

It should be understood that a virtual computer is equivalent to an independent computer, and that the virtual computer performs an action may also be considered as that a virtual processor performs the action. In addition, the virtual processor is implemented by software. Therefore, that the virtual processor performs the action is actually that a physical processor or a physical core that runs the virtual processor performs the action. In a plurality of embodiments of the present invention, the foregoing expression manners may be selectively used, to conform to technical expression habits in a current scenario.

Trap-in of a virtual processor and trap-out of a virtual processor: A virtual system includes two modes: a host mode (host mode) and a guest mode (guest mode). When a virtual processor enters a guest mode, this is called trap-in (virtual); and when the virtual processor exits the guest mode, this is called trap-out (virtual). After a virtual processor traps out, a physical processor temporarily stops executing code of the virtual processor. Therefore, this case may be understood as that the virtual processor is not running. In most embodiments of this application, a method or an apparatus is described by using a virtual processor such as a vCPU as an example. Therefore, in these embodiments, the trap-in or trap-out of the virtual processor is specifically trap-in or trap-out of the vCPU. For a physical processor, when a virtual processor that runs on the physical processor traps in, it may be considered that the physical processor is in a guest mode, and code of the virtual processor is executed; or when a virtual processor that runs on the physical processor traps out to a host mode, it may be considered that the physical processor is in a host mode, and runs host-related code, such as VMM.

In-service or out-of-service of a virtual processor: A state obtained after a virtual processor traps in is referred to as in-service, and a state obtained before a virtual processor traps in is referred to as out-of-service. That a virtual processor is in service may be understood as that the virtual processor is running, that is, code of the virtual processor is executed by a physical processor. That a virtual processor is out of service means that no physical processor executes code of the virtual processor. In most embodiments of this application, a method or an apparatus is described by using a virtual processor such as a vCPU as an example. Therefore, in these embodiments, the in-service or out-of-service of a virtual processor is specifically in-service or out-of-service of the vCPU.

An IPI inter-processor interrupt is an interrupt between processors, is a special interrupt, and is an interrupt request sent by a processor to another processor. For example, the IPI is an interrupt command register (interrupt command register, ICR) of an APIC. The ICR allows software running on a processor to send an IPI interrupt to another processor. Some IPIs are triggered by a guest operating system to implement system maintenance, and may be considered as interrupt requests of the guest operating system. Some IPIs are triggered by a service, and therefore may be considered as application interrupt requests. In this application, an IPI interrupt carries different parameters in different scenarios, and a corresponding interrupt service routine is added, so as to achieve a technical effect in some embodiments.

In addition, in descriptions of the present invention, "plurality" means at least two, unless otherwise specified. In this application, a term "and/or" or a character "/" describes only an association relationship between associated objects, and indicates that three relationships may exist. For example, A and/or B, or A/B may indicate the following three cases: A exists alone, both A and B exist, and B exists alone.

The following clearly describes the technical solutions in the embodiments of the present invention with reference to the accompanying drawings in the embodiments of the present invention.

FIG. 1 shows an embodiment of a network system as an example. The network system includes network devices such as user equipment, an evolved NodeB (eNodeB) 100, a mobility management component entity (mobility management entity, MME), and a serving gateway. The network system may also be a network system complying with a 5G communications standard. The user equipment includes a mobile phone, a desktop computer, a notebook computer, an in-vehicle device, and the like. In addition, the network system may further include other network devices such as a home subscriber server and a PDN network gateway, to name just a few.

Figure 2:
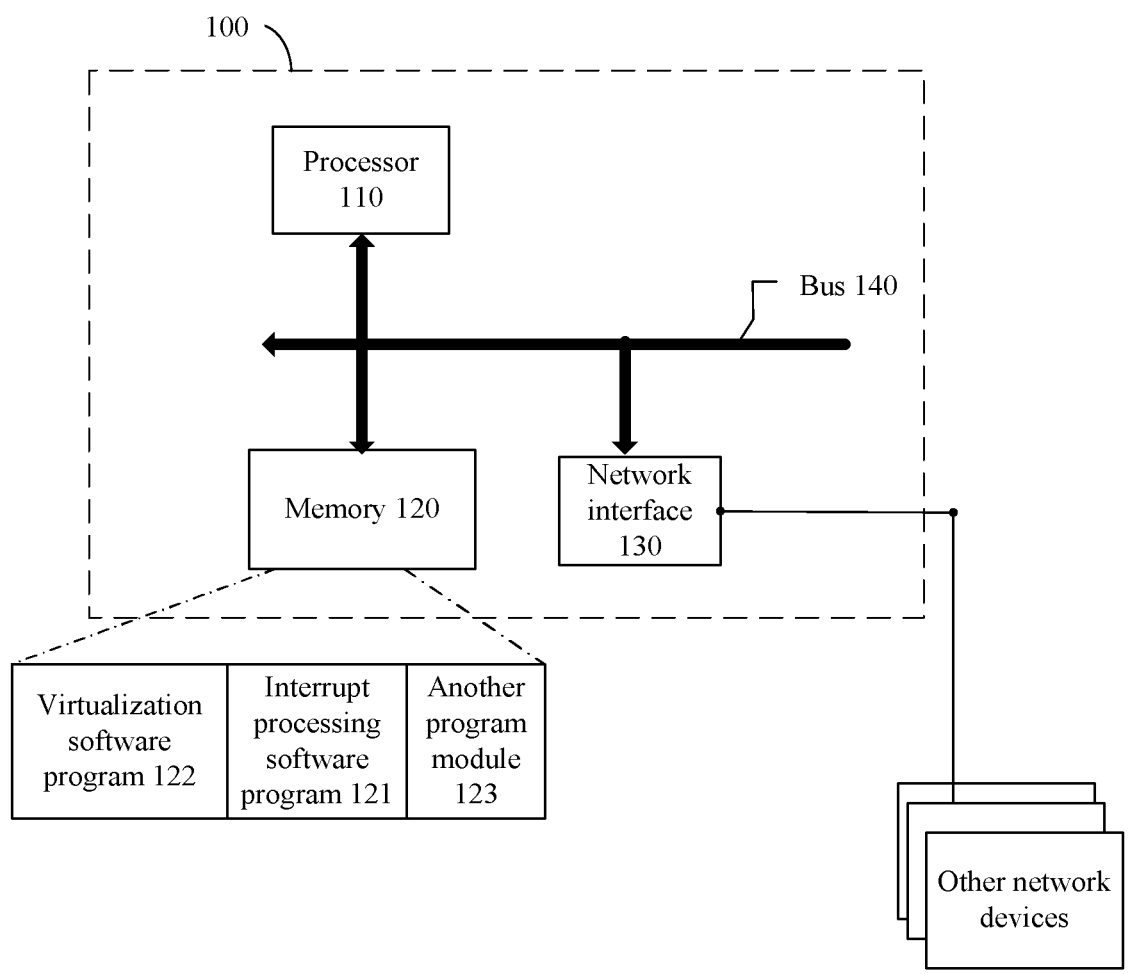
FIG. 2 is a schematic diagram of a hardware structure of a virtualized network device according to an embodiment of the present invention.

FIG. 2 is a schematic diagram of a hardware structure of the eNodeB 100 in the foregoing embodiment, and may be specifically considered as a schematic diagram of a hardware structure of a service processing board of the evolved NodeB. The eNodeB 100 includes components such as a processor 110, a memory 120, and a network interface 130 (also referred to as a network interface card or a network adapter). The processor 110 may be a single-core processor, or may be a multi-core processor. When the processor 110 is a multi-core processor, a method provided in this application may run on one core, or may run on different cores in a distributed manner. There may be one processor 110, or may be a plurality of processors 110. The plurality of processors 110 may be of a same type or different types. Processor types include a central processing unit (central processing unit, CPU), a graphics processing unit, a microprocessor, a coprocessor, or the like. The network interface 130 is configured to connect other network devices, including a wireless connection and a wired connection. The memory 120 includes a volatile memory and a nonvolatile memory. Usually, the nonvolatile memory stores a virtualization software program 122, software program 121 in an interrupt request processing method provided in this application, and another program module 123. After being read and executed by the processor 110, the virtualization software program 122 implements virtualization of the eNodeB 100, including: creating a host layer, a plurality of virtual computers, and the like. After being read and executed by the processor 110, the interrupt processing software program 121 provided in this application implements various interrupt request processing methods provided in the embodiments of this application. The software program 121 provided in this application may be integrated into the virtualization software program 122.

The foregoing components are connected by using a bus 140. The bus 140 may be one bus, or may be a plurality of buses. The bus 140 includes an advanced microcontroller bus architecture (AMBA) industry standard architecture (ISA) bus, a micro channel architecture (MCA) bus, an extended ISAbus, a video electronics standards association (VESA) local area bus, a peripheral component interconnect (PCI) bus, and the like.

Figure 3A:
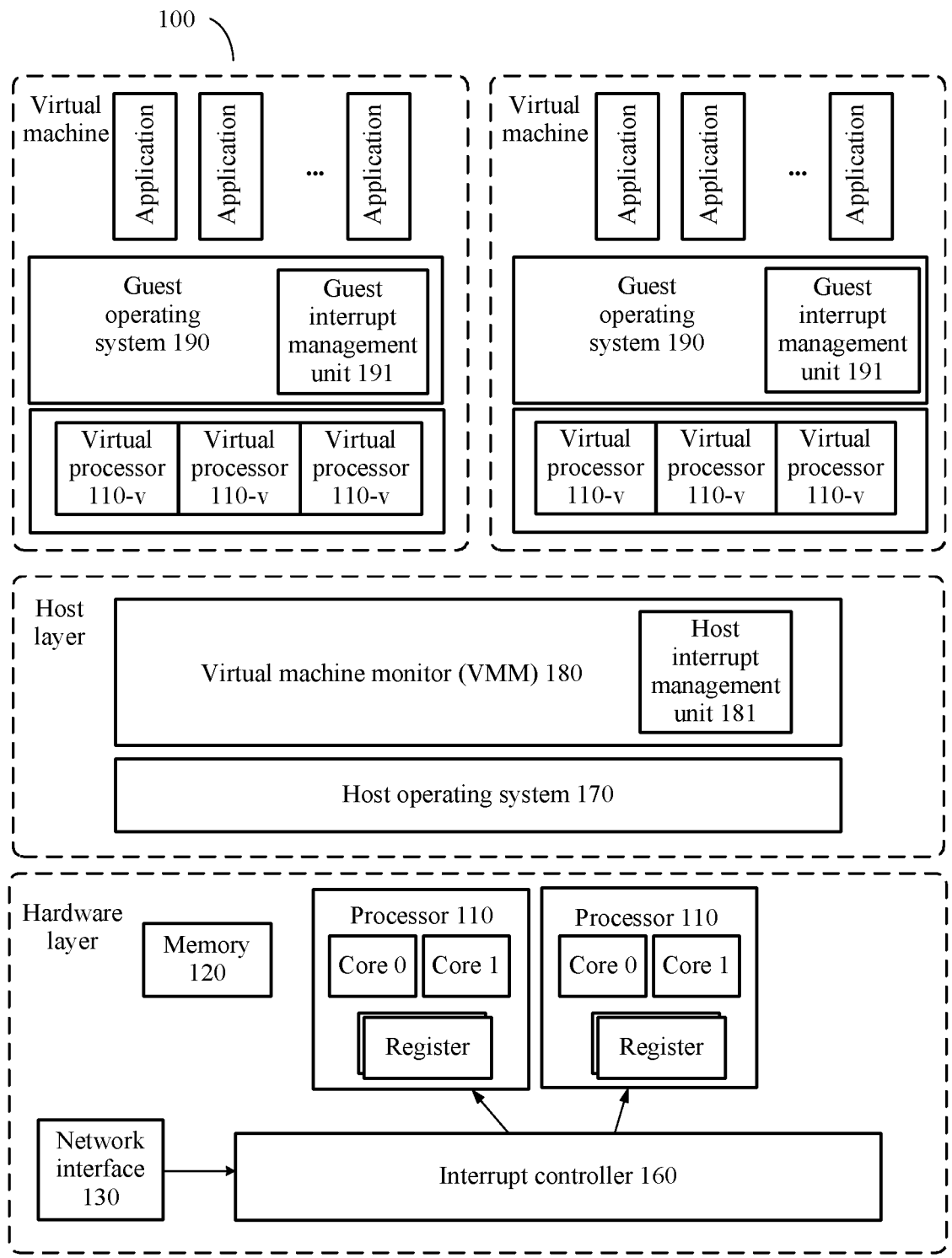
FIG. 3A is a schematic configuration diagram of a virtualized network device according to an embodiment of the present invention.

FIG. 3A shows a schematic diagram of a configuration after virtualization of the eNodeB 100 in the foregoing embodiment. The virtualized device 100 includes a hardware layer, a host layer, and a virtualization layer. The virtualization layer includes two virtual machines. The hardware layer includes hardware such as two processors 110, a memory 120, a network interface 130, and an interrupt controller 160. In another embodiment, there may be more or fewer processors 110 and virtual machines.

In some other embodiments, a virtual machine may include a container (container). The container is equivalent to an application. In some other embodiments, referring to FIG. 3B, a virtualization layer is implemented by using a light-weight virtualization technology, such as a libOS 190. One libOS usually includes one application. The entire libOS is one or more libraries, and is linked to the application to obtain a single-address space image. The libOS 190 includes a guest interrupt management unit 191 provided in this application. A virtual machine implemented by using a conventional virtualization technology is usually used as an example in this embodiment of this application. Other types of virtualization architectures may be implemented with reference to the virtual machine.

It should be noted that the eNodeB 110 is used as an example in this embodiment, but a method provided in this application is not limited to the device, and may be applied to all types of virtualized devices.

The interrupt controller 160 is responsible for collecting interrupt requests generated by hardware devices such as the network interface 130, and sending the interrupt requests to the processors 110 according to a specific rule. A processor 110 may include one or more physical cores (a physical core is sometimes referred to as a core in this application).

Figure 3B:
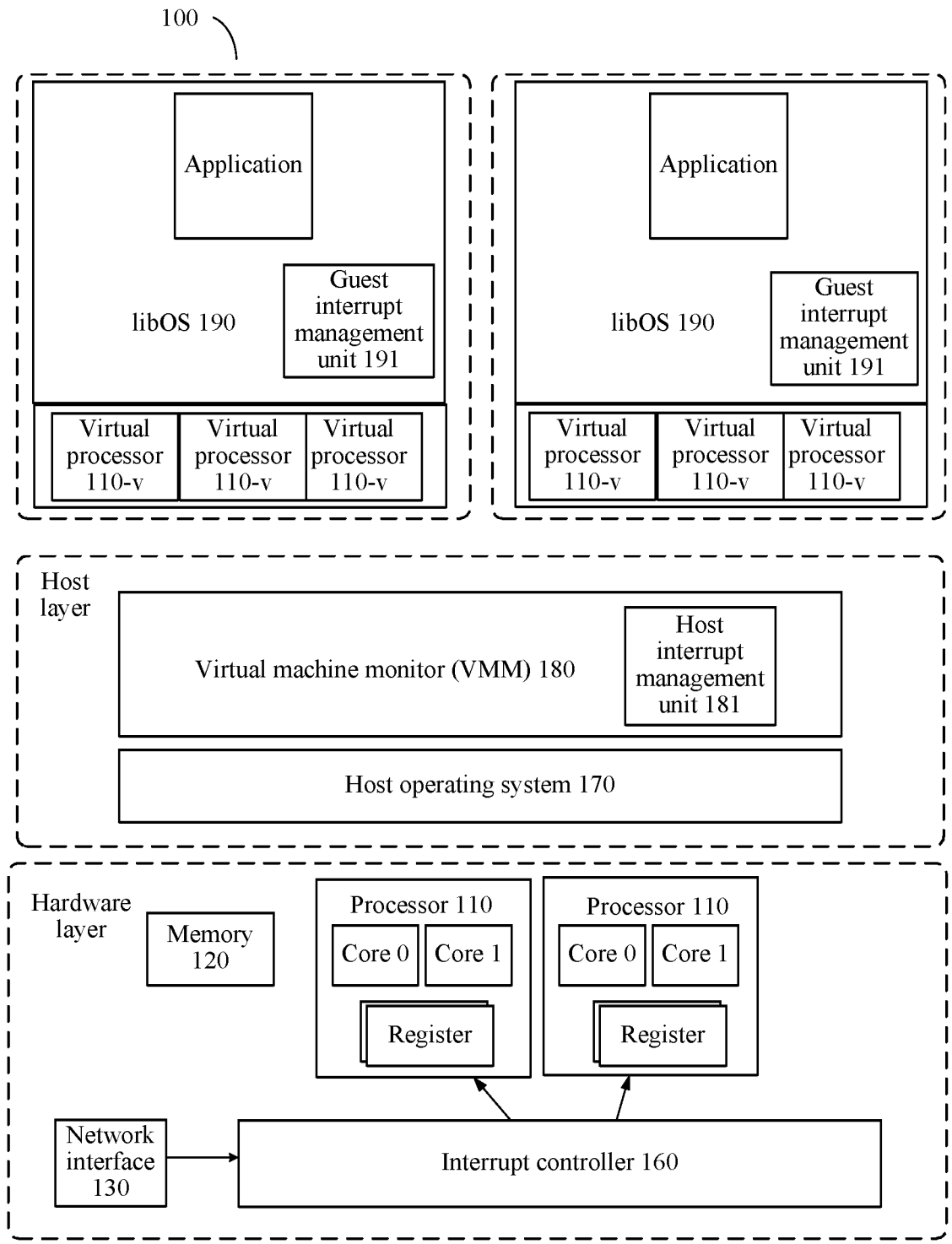
FIG. 3B is a schematic configuration diagram of another virtualized network device according to an embodiment of the present invention.

The "physical core" represents a smallest processing unit in this application. As shown in FIG. 3A or FIG. 3B, each processor in this embodiment has two physical cores: a core 0 and a core 1, and a plurality of registers. In some other embodiments, the processor may include more or fewer cores, and different processors may include different quantities of cores.

A host operating system 170 and a VMM 180 are deployed on a host. The VMM 180 is equivalent to a hypervisor or another type of virtual monitoring apparatus in another virtualization architecture. The VMM 180 may be deployed in the host operating system 170, or the VMM 180 and the host operating system 170 may be deployed separately. The VMM 180 is responsible for managing one or more virtual machines running on the VMM 180.

A virtual machine (VM) includes a virtual hardware layer, a guest operating system 190, and a plurality of applications. The virtual hardware layer includes virtual hardware such as a virtual memory (not shown in the figure) and a virtual processor 110-$v$. As shown in FIG. 3A or FIG. 3B, this embodiment includes two virtual machines. Each virtual machine includes three virtual processors 110-$v$. A virtual processor 110-$v$ is implemented by a combination of software and hardware. Running of the virtual processor 110-$v$ is actually implemented by a physical core reading and running a software program. For example, a physical core reads a software program, and runs the software program in a specific hardware-assisted virtualization mode of the physical core (for example, a non-Root mode of X86), to implement a virtual processor 110-*v*. Therefore, a virtual processor 110-*v* needs to be scheduled onto a physical core.

A virtual processor 110-*v* may be bound to a physical core, that is, a virtual processor 110-*v* always runs on a specific physical core, and cannot be scheduled onto another physical core for running. If a virtual processor 110-*v* may be scheduled, depending on a requirement, onto different physical cores for running, the virtual processor is not bound to a physical core.

In this embodiment, a total quantity of virtual processors 110-*v* is 6, and is greater than a quantity of physical cores: 4. This scenario is referred to as excessive allocation of a physical processor. In a case of excessive allocation of a physical processor, a plurality of virtual processors may share one physical core in a manner of time fragmentation or in another manner. This physical core is called a non-exclusive core. Certainly, there may also be a non-exclusive core in a case without excessive allocation. If one physical core is bound to one virtual processor and is not shared by another virtual processor, the physical core is an exclusive core.

As a virtual monitoring apparatus, the VMM 180 is responsible for scheduling virtual processors 110-*v* of VMs. For example, a kernel-based virtual machine (kernel-based virtual machine, KVM) is a typical VMM. Scheduling a virtual processor 110-*v* by the VMM 180 includes swapping in a virtual processor and swapping out a virtual processor. First, the VMM 180 creates and initializes an object of a VM, and then creates three virtual processors 110-*v* for the VM. When a VM includes a plurality of virtual processors 110-*v*, usually, one virtual processor is a primary virtual processor, and others are secondary virtual processors. When a virtual processor 110-*v* is initially created, the virtual processor 110-*v* is not associated with a physical core. That the VMM 180 schedules a virtual processor 110-*v* onto a physical core according to a policy is referred to as swapping in the virtual processor. That the VMM 180 suspends the virtual processor 110-*v* or migrates the virtual processor 110-*v* out of the physical core is referred to as swapping out the virtual processor. If the virtual processor is bound to a physical core, each time a virtual processor is swapped in, the virtual processor is scheduled onto a same core. If the virtual processor is not bound to a physical core, before scheduling, the VMM 180 may determine, based on a current running status of a system and/or a scheduling algorithm, a core onto which the virtual processor 110-*v* is to be scheduled.

It should be noted that after being swapped in, a virtual processor 110-*v* may not immediately trap in and run. After the virtual processor 110-*v* is swapped in and before the virtual processor 110-*v* traps in, a host (which is specifically the VMM) may further implement some configurations for the virtual processor 110-*v*, and then the virtual processor 110-*v* traps in a guest mode.

Based on the configuration in FIG. 3A or FIG. 3B, an existing interrupt request processing solution is usually designed according to a "system interrupt first" rule, and all interrupt requests generated by hardware are directly sent to a host layer. Therefore, an interrupt request processing procedure at the host layer is relatively fast. However, in this solution, an application interrupt request needs to be identified by a host and then sent to a virtual machine. Therefore, the entire processing procedure includes two processing entities: the host and the virtual machine (or considered as a virtual processor), and includes trap-in and trap-out of a virtual processor. As a result, the processing procedure becomes longer, and a delay increases. This obviously cannot meet an ultra-low delay requirement of service processing. Therefore, this application provides a method for effectively reducing an application interrupt request processing delay, and progressively extends more functions based on the method.

To resolve the foregoing problem that an application interrupt request processing delay is large, the device 100 provided in this embodiment includes a host interrupt management unit 181 and the guest interrupt management unit 191. The two units may be considered as two function modules of the interrupt processing software program 121 in FIG. 2.

The host interrupt management unit 181 is deployed at the host layer. When the VMM 180 is deployed in the host operating system 170, the host interrupt management unit 181 may be deployed in the host operating system 170; or may be deployed in the VMM 180; or may be partially deployed in the host operating system 170 and partially deployed in the VMM 180. When the VMM 180 is deployed in the host operating system 170, the host interrupt management unit 181 may be deployed in the VMM 180; or may be deployed in the host operating system 170 but not in the VMM 180; or may be partially deployed in the VMM 180 and partially deployed in the host operating system 170 but not in the VMM 180.

The guest interrupt management unit 191 may be deployed in a guest operating system 190 of each virtual machine. When a virtualization layer of a virtualized computer device is a libOS, the guest interrupt management unit 191 may be deployed in a runtime library of the libOS. The guest interrupt management unit 191 is configured to be able to directly receive an interrupt request from the hardware layer.

The guest interrupt management unit 191 is configured to directly receive an interrupt request from the interrupt controller 160 or another interrupt collection apparatus, and determine a processing entity of the interrupt request. If the processing entity of the interrupt request is a current virtual processor of a current virtual machine, an interrupt service routine is directly invoked. Further, if the processing entity of the interrupt request is the host, the interrupt request is sent to the host. Further, if the processing entity of the interrupt request is another virtual processor instead of a current virtual processor, the interrupt request is scheduled to the another virtual processor for processing. If the another virtual processor is in service, the interrupt request may be scheduled by sending an IPI; or if the another virtual processor is out of service, the interrupt request may be recorded, so that the another virtual processor processes the interrupt request after getting in service. It should be noted that the "current virtual machine" is a virtual machine to which the guest interrupt management unit 191 belongs, and the "current virtual processor" is a virtual processor that currently reads and runs the guest interrupt management unit 191.

The host interrupt management unit 181 is configured to configure an interrupt receiving mode of the virtual processor 110-*v*, so that the virtual processor 110-*v* may receive an interrupt request from the hardware layer in a guest mode. In some implementations, the host interrupt management unit 181 is further configured to configure a mode for operating the interrupt controller 160 by the virtual processor 110-*v*, so that the virtual processor 110-*v* can directly operate the physical interrupt controller 160 (usually a local interrupt controller of a physical core that runs the virtual processor) in the guest mode. Further, the host interrupt management unit 181 is further configured to manage information required for interrupt request processing (refer to Table 1 and Table 2 in the following embodiment), where the information includes information provided when an application registers an interrupt request; and store the information in a storage area that can be shared by the virtual machine and the host, so that the virtual machine and the host may access or modify the information. Further, the host interrupt management unit 181 is further configured to receive an interrupt request sent by the virtual machine, and send the interrupt request to an existing interrupt processing module in the host. The module invokes an interrupt service routine deployed in the host to process the interrupt request.

Figure 4:
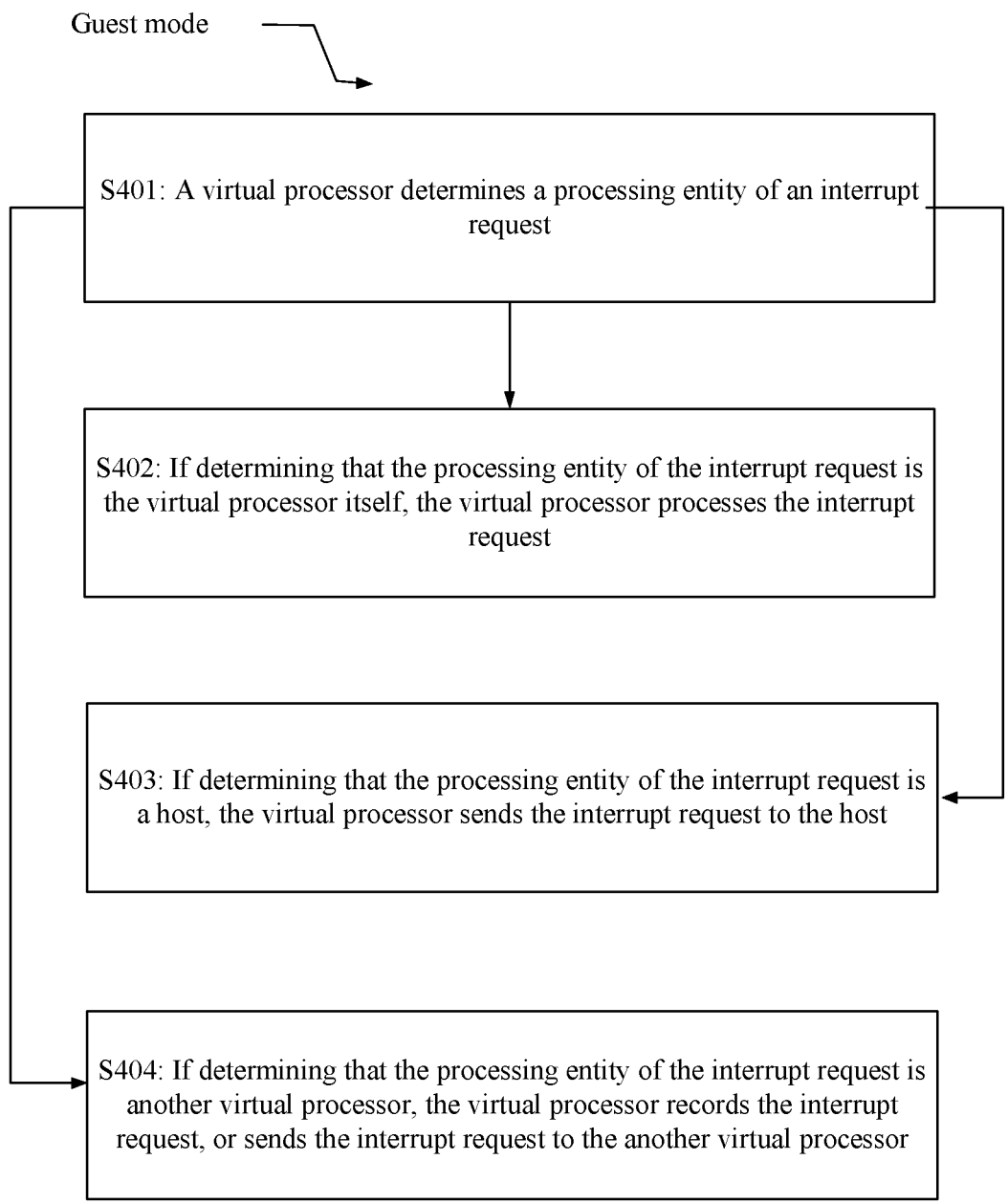
FIG. 4 is a schematic flowchart of an interrupt processing method according to an embodiment of the present invention.

Referring to FIG. 4, from a perspective of the virtual processor 110-*v*, an action performed by the guest interrupt management unit 191 may be considered as an action performed by the current virtual processor of the current virtual machine in the guest mode (namely, a trap-in state).

Specifically, the virtual processor 110-*v* first determines a processing entity of a received interrupt request (S401). If determining that the processing entity of the interrupt request is the virtual processor 110-*v* itself, the virtual processor 110-*v* processes the interrupt request (S402); if determining that the processing entity of the interrupt request is the host, the virtual processor 110-*v* sends the interrupt request to the host (S403); or if determining that the processing entity of the interrupt request is another virtual processor, the virtual processor 110-*v* records the interrupt request in a storage area that can be shared by all virtual processors, or sends the interrupt request to the another virtual processor, for example, by using an IPI (S404), so that the another virtual processor accesses the storage area and processes the interrupt request, or processes the interrupt request after receiving the IPI. If the host interrupt management unit 181 configures the virtual processor 110-*v* so that the virtual processor 110-*v* can directly operate the physical interrupt controller 160 in the guest mode, the virtual processor 110-*v* may directly operate, in the guest mode, the interrupt controller 160 to send the IPI to the another virtual processor, where the IPI carries information about the unprocessed interrupt request.

Further, implementations of step S404 are as follows: If determining that the processing entity of the interrupt request is the another virtual processor, in some implementations, the virtual processor records the interrupt request only in the storage area that can be shared by all the virtual processors, and the processing entity of the interrupt request accesses the storage area and processes the interrupt request at a proper time based on a running status of the processing entity. In some other implementations, the virtual processor may first determine whether the processing entity is in service; and if the processing entity is in service, the virtual processor sends the interrupt request to the in-service processing entity by sending an IPI, so that the processing entity processes the interrupt request as soon as possible; or if the processing entity is out of service, the virtual processor records the interrupt request in the storage area that can be shared by all the virtual processors, and may further determine a transit virtual processor (which may be the virtual processor itself), and send an IPI interrupt to the transit virtual processor. The transit virtual processor traps out to the host after receiving the IPI interrupt. Then the host swaps in the processing entity. After being swapped in, the processing entity processes the interrupt request. If the transit virtual processor is the virtual processor itself, the virtual processor sends an identifier of the processing entity to the host, and traps out, so that the host swaps in the processing entity.

There are also some other implementations of step S404: After an interrupt affinity attribute of the interrupt controller is configured according to the method provided in this application, if it is determined that the processing entity of the interrupt request is the another virtual processor, there is no need to determine whether the processing entity is in service, because the processing entity is definitely out of service. Therefore, the interrupt request may be recorded in the storage area that can be shared by all the virtual processors. Like that in the manner described in the foregoing paragraph, the host machine may also be actively triggered to swap in the processing entity, to ensure that the interrupt request is processed as soon as possible.

It can be learned from the foregoing embodiments that, according to the interrupt request processing method provided in the embodiments of the present invention, a virtual processor (or a virtual machine served by the virtual processor) can directly receive an interrupt request generated by hardware. For an application interrupt request, the virtual processor may directly invoke an interrupt service routine in the virtual machine to process the application interrupt request, without forwarding by a host or trap-in and trap-out of the virtual processor. This greatly improves processing efficiency of the application interrupt request, and reduces a processing delay of the application interrupt request. Certainly, a same effect is also achieved for a guest operating system interrupt request.

Further, for an interrupt request not to be processed by a current virtual processor, the interrupt request can be recorded while the current virtual processor does not need to trap out, or the interrupt request is sent to another virtual processor while the current virtual processor does not need to trap out, so that the another virtual processor may process the interrupt request as soon as possible. This further improves processing efficiency of the interrupt request.

Further, for an interrupt request that needs to be processed by a host, the interrupt request can be reversely sent to the host, so that the interrupt request is processed in a timely manner. In this way, the method provided in the embodiments of the present invention may be applied to a complex system in which there is definitely an interrupt request that needs to be processed by a host, and the embodiments of the present invention are applied more widely.

Figure 5:
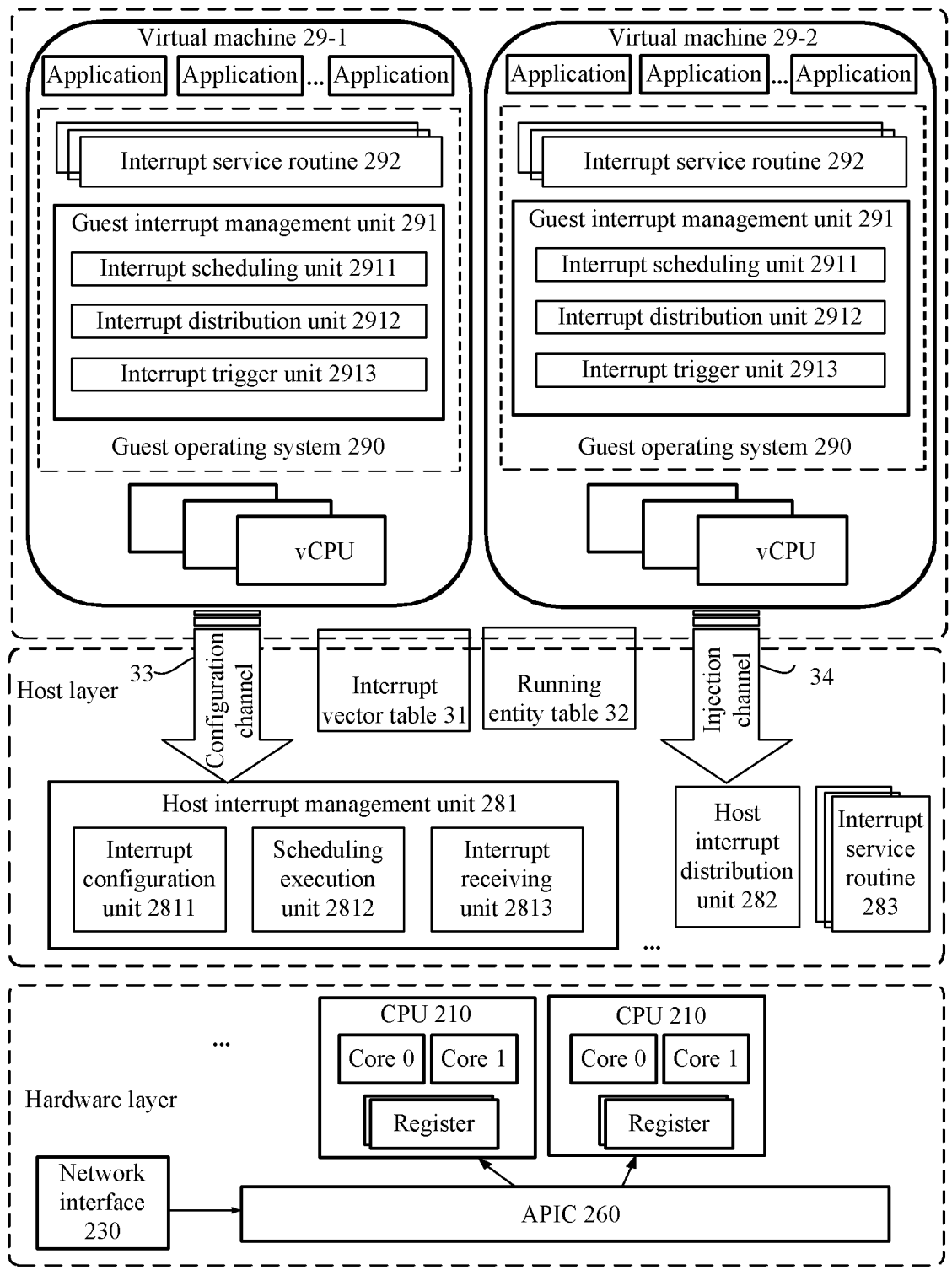
FIG. 5 is a first schematic diagram of function units and modules of a virtualized network device according to an embodiment of the present invention.

FIG. 5 shows a more detailed embodiment. In this embodiment, a processor is a central processing unit (central processing unit, CPU) 210, a virtual processor is a vCPU, an interrupt controller is an advanced programmable interrupt controller (Advanced Programmable Interrupt Controller, APIC) 260, and two virtual machines are a virtual machine 29-1 and a virtual machine 29-2. The APIC 260 usually includes one io-APIC, and four local-APICs respectively corresponding to four physical cores.

A host interrupt management unit 281 includes an interrupt configuration unit 2811, a scheduling execution unit 2812, and an interrupt receiving unit 2813. A guest interrupt management unit 291 includes an interrupt scheduling unit 2911, an interrupt distribution unit 2912, and an interrupt trigger unit 2913. An interrupt vector table 31 and a running entity table 32 store information required for processing an interrupt request. To facilitate information management, in this embodiment, both the two tables are located in a storage area accessible to all virtual machines (all virtual processors) and a host. This also facilitates implementation of methods provided in all the following embodiments. In some other embodiments, forms and content of the two tables are allowed to be adjusted depending on a situation.

The interrupt vector table 31 is mainly used to record an identifier of an application interrupt request, and a processing entity and an interrupt service routine that are corresponding to the application interrupt request, and may further record information about an IPI interrupt request and/or a guest operating system interrupt request.

The interrupt vector table 31 may further include an identifier of a guest operating system interrupt request, such as an IPI interrupt, a corresponding processing entity, and a corresponding interrupt service routine.

The running entity table 32 is mainly used to record current statuses of all vCPUs included in VMs, for example, whether the vCPUs are in service, and record interrupt requests to be processed by the vCPUs.

Table 1 and Table 2 are examples of the interrupt vector table 31 and the running entity table 32 respectively.

TABLE 1

Interrupt vector table

| Member | Meaning |
|---|---|
| IRQ ID | An identifier of an interrupt request that needs to be processed. This table may store an identifier of an application interrupt request that needs to be processed. |
| VM ID | A VM identifier allocated by a VMM |
| vCPU LIST | Indicating that a processing entity of an interrupt request is one or more specific vCPUs, in other words, recording vCPU IDs of all vCPUs that can process the interrupt request. |
| ISR ADDR | An address of an ISR used to process an interrupt request. A vCPU invokes the ISR to process the interrupt request. |
| PRIORITY | A priority of an interrupt request |
| TYPE | 0 indicates an interrupt that needs to be processed by a single core (the interrupt needs to be processed by any vCPU in the vCPU LIST); and 1 indicates an interrupt that needs to be processed by a plurality of cores (the interrupt needs to be processed by all cores in the vCPU LIST). |

Table 1 stores only an IRQ ID of an application interrupt request, and a processing entity and an interrupt service routine that are corresponding to the application interrupt request. If an IRQ ID of an interrupt request is not in the table, it is considered by default that the interrupt request needs to be processed by the host, and the interrupt request is sent to (or referred to as injected into) the host, so that the host processes the interrupt request.

In some other embodiments, Table 1 may alternatively store identifiers of all interrupt requests, where a processing entity is recorded as a virtual machine or the host; or may store identifiers of all interrupt requests, where that a VM ID is empty indicates that a processing entity is the host; or the like. Various variations of information storage manners are readily figured out by a person skilled in the art, and are not described one by one herein.

In this embodiment of the present invention, a specific data structure of the vCPU LIST may be implemented as a bitmap, and each bit (bit) in the bitmap represents one vCPU.

PRIORITY in Table 1 records a priority of an interrupt request. A manner of setting a priority of an interrupt request needs to be similar to a manner of setting a priority of a vCPU (refer to Table 2) in the VMM, so that the two priorities may be compared subsequently. A priority of an interrupt request may be different from a priority of a vCPU processing the interrupt request. A comparison result of the two priorities may be used as a reference for determining which vCPU is to be preempted by an interrupt request and runs after the interrupt request arrives in some embodiments.

PRIORITY is configured before a related VM starts. Specifically, a user may perform configuration by using a uniform configuration interface (a sysfs interface or a proc interface) of the interrupt configuration unit (2811). An interrupt type TYPE may also be configured in a similar manner.

TABLE 2

Running entity table

| Member | Meaning |
|---|---|
| VM ID | A VM identifier allocated by a VMM |
| vCPU ID | An identifier of one or more vCPUs included in a VM |
| CORE ID | Indicating whether a vCPU is in service. If the vCPU is out of service, CORE ID is −1; or if the vCPU is in service, CORE ID is not −1. |

TABLE 2-continued

Running entity table

| Member | Meaning |
|---|---|
| PRIORITY | A priority of a vCPU, obtained from the VMM. The priority of the vCPU is a priority of a current task on the Vcpu. |
| PENDING | This may be implemented as a bitmap, and each bit (bit) represents one interrupt request. A default value is −1. If an interrupt that needs to be processed by a vCPU is not processed, one bit corresponding to the vCPU is set to an IRQ ID of the interrupt. |

In some embodiments of this application, the content stored in the interrupt vector table 31 and the running entity table 32 may be more or less than the examples in Table 1 and Table 2. For example, VM ID in the two tables may not be stored. However, convenience may be improved in some scenarios if VM ID is stored. For example, an interrupt request may be processed by all vCPUs of a VM. In this case, only VM ID needs to be determined. In some embodiments, PRIORITY and/or TYPE information may not be stored.

A configuration channel 33 and an injection channel 34 are configured between each virtual machine (29-1 and 29-2) and the host. The configuration channel 33 is mainly used by the guest interrupt management unit 291 to fill the interrupt vector table 31. The injection channel 34 is mainly used by the guest interrupt management unit 291 to inject, into the host, an interrupt request to be processed by the host, so that the host interrupt management unit 281 processes the interrupt request.

The virtual machine and the host each include a plurality of interrupt service routines (292 and 283), which are used to process an interrupt request after being invoked. The interrupt service routine 292 in the virtual machine is usually deployed by an application installed on the virtual machine, and is used to process an application interrupt request. Certainly, some interrupt service routines 292 are deployed by a guest operating system 290, and are used to process a guest operating system interrupt request.

The host further includes the host interrupt distribution unit 282, configured to receive an interrupt request that is received by the host interrupt management unit 281 (specifically, the interrupt receiving unit 2813) from the guest interrupt management unit 291, and invoke an interrupt service routine 283 corresponding to the interrupt request. The host interrupt distribution unit 282 also exists in some existing virtualization architectures, and in this embodiment, is configured to receive an interrupt request from the host interrupt management unit 281, but not directly from the APIC 260. Other modules in FIG. 5 are similar to those in FIG. 4, and details are not described herein again.

The following describes a detailed method implementation process based on FIG. 5.

(1) Initialization of the Host Interrupt Management Unit

Figure 6:
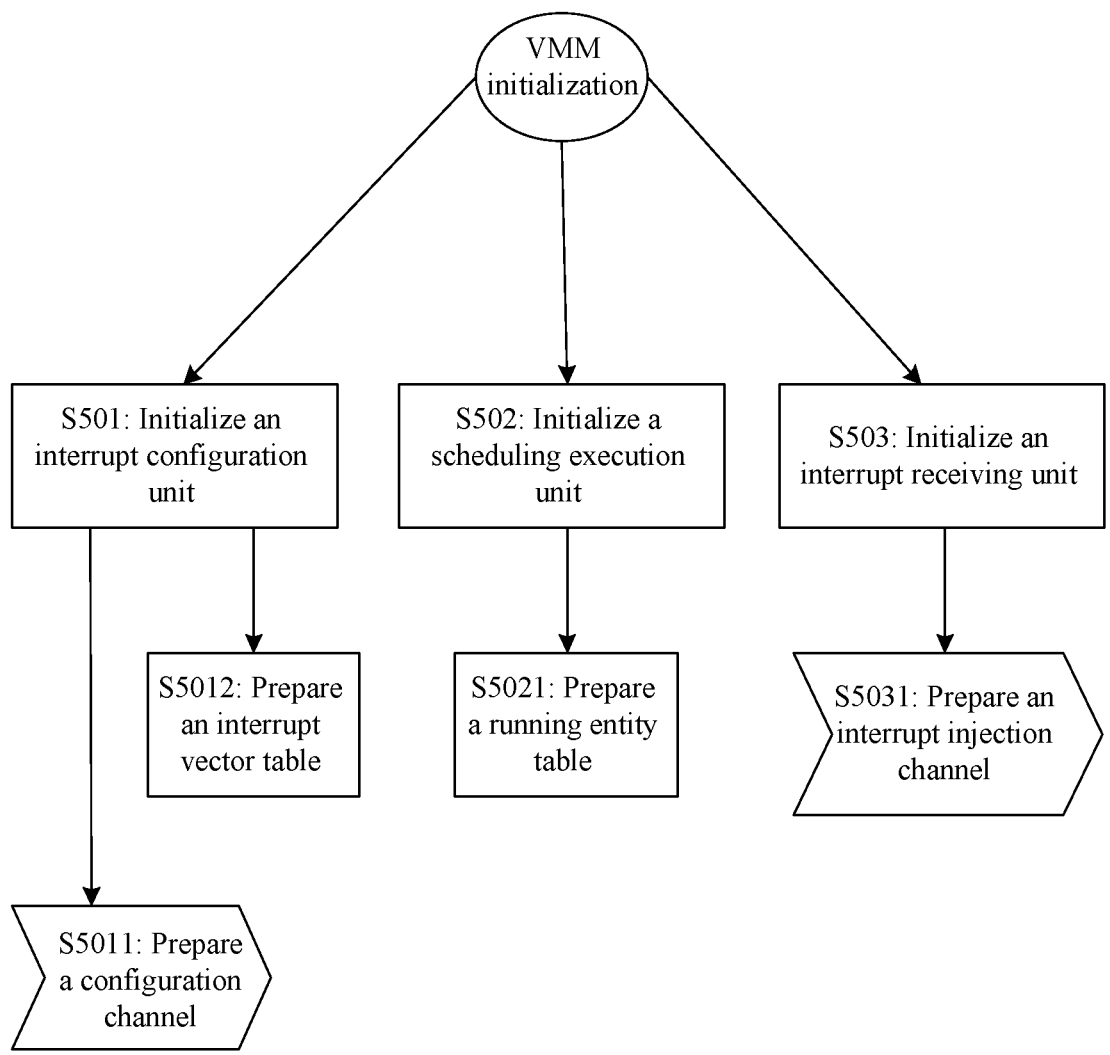
FIG. 6 is a schematic flowchart of initializing a host interrupt management unit according to an embodiment of the present invention.

An example in which the host interrupt management unit 281 is located in the VMM is used as an example in this embodiment. FIG. 6 is a schematic flowchart of initializing the host interrupt management unit 281. Initialization of the host interrupt management unit 281 is performed along with initialization of the VMM.

Initializing the interrupt configuration unit 2811 (S501) includes: preparing the configuration channel 33 (S5011) and preparing the interrupt vector table 31 (S5012). The preparing the configuration channel 33 (S5011) includes: mounting a hypercall function used as the configuration channel 33 to a hypercall framework of the VMM, so that the virtual machines (29-1 and 29-2) may use the configuration channel 33 by invoking the function through hypercall. The preparing the interrupt vector table 31 (S5012) includes: determining a shared memory area, dividing entries of the interrupt vector table 31, and the like (refer to Table 1). The shared memory area is configured to store content of the interrupt vector table.

Initializing the executing scheduling unit 2812 (S502) includes: preparing the running entity table 32 (S5021). The preparing the running entity table 32 (S5021) includes: determining another shared memory area, dividing entries of the running entity table 32, and the like (refer to Table 2). The shared memory area is configured to store content of the running entity table 32.

The "shared memory area" provided in this embodiment is a segment of storage area accessible to all the virtual machines (29-1 and 29-2) and the host.

Initializing the interrupt receiving unit 2813 (S503) includes: preparing the injection channel 34 (S5031), and specifically includes: mounting a hypercall function used for interrupt injection to the hypercall framework of the VMM, so that the virtual machines (29-1 and 29-2) may invoke the function through hypercall.

Initialization of the foregoing three units may be performed before or after initialization of a core module of the VMM is completed; or may be performed after initialization of a core module of the VMM is partially completed, and then a remaining initialization process of the core module of the VMM continues to be completed. The initialization of the foregoing three units may be executed in parallel or in series, and an execution sequence is not limited in this embodiment of the present invention.

(2) Initialization of the Guest Interrupt Management Unit

After the VMM is initialized and starts, the initialization of the host interrupt management unit 281 is also completed. Then the VMM creates and starts the two virtual machines (29-1 and 29-2). During creation and start of the virtual machines (29-1 and 29-2), the initialization of the guest interrupt management unit 291 is completed.

Figure 7:
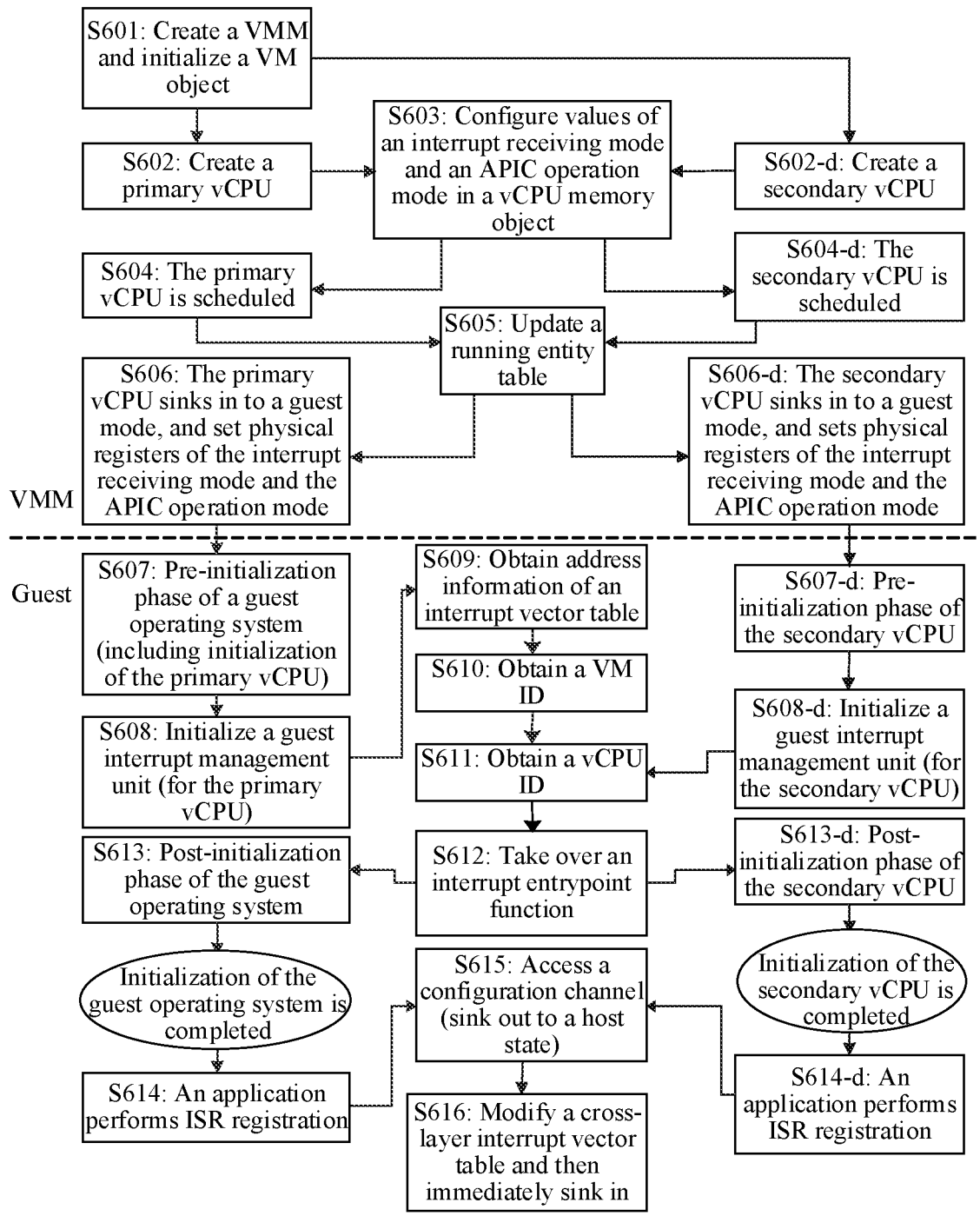
FIG. 7 is a schematic flowchart of initializing a guest interrupt management unit according to an embodiment of the present invention.

Referring to FIG. 7, an entire start process of a virtual machine is divided into two parts: before vCPU trap-in and after the vCPU trap-in.

S601: The VMM 180 creates and initializes a VM object.

S602 and S602-d: The VMM 180 creates a primary vCPU and a secondary vCPU for the VM object.

In FIG. 5, one virtual machine has three vCPUs, where one vCPU is a primary vCPU, and the other two are secondary vCPUs. This embodiment is described by using the primary vCPU and one secondary vCPU as examples. An initialization process of the other secondary vCPU is similar to that of the described secondary vCPU.

S603: The VMM 180 configures an interrupt receiving mode and an APIC 260 operation mode for the primary vCPU and the secondary vCPU based on custom parameters. An objective of the configuration is to enable the vCPU to: receive, in a guest mode (in other words, after trapping in), an interrupt request sent by the APIC, and operate the APIC 260 in the guest mode. The custom parameters herein are defined in this application, and these parameters are used to instruct the VMM to configure the VM according to the foregoing configuration. These two modes of the vCPU are indicated by different bits in a register corresponding to the vCPU.

Specifically, after two bits, that is, FMO and IMO, of an HCR_EL2 (hypervisor configuration register EL2) register of a physical CPU are disabled on an ARM64 platform, a vCPU may receive an interrupt request and operate a physical APIC without trapping out. On an X86 platform, after a bit 0 (external-interrupt exiting) of Pin-Based VM-Execution Controls control bits of a VMCS (virtual machine control structure) is set to 0, an interrupt request may be received without trap-out; and after a bit 7 (process posted interrupts) of the Pin-Based VM-Execution Controls control bits of the VMCS is set to 0, a bit 21 (Use TPR Shadow) of Primary Processor-Based VM-Execution Controls control bits of the VMCS is set to 0, a bit 8 (APCI-register virtualization) and a bit 9 (Virtual-interrupt delivery) of Secondary Processor-Based VM-Execution Controls control bits of the VMCS are set to 0, and LAPIC-related bits in MSR-Bitmap of VM-execution control of the VMCS are set to 0, a vCPU may directly operate a physical APIC.

However, in step S603, values of memory objects related to the interrupt receiving mode and the APIC 260 operation mode are configured (essentially, the values are recorded in memories), but no physical register is really modified.

Step S603 may be implemented by the interrupt configuration unit 2811 in the host interrupt management unit 281.

S604 and S604-d: The VMM 180 separately schedules the primary vCPU and the secondary vCPU to physical cores. However, in this case, the primary vCPU and the secondary vCPU have not sunk in.

S605: The VMM 180 updates the running entity table 32.

The VMM 180 records, in the running entity table 32, a VM ID and a vCPU ID of a current vCPU, a CORE ID of a physical core corresponding to the vCPU, and a priority of the vCPU. The priority of the vCPU is usually set in the VMM, and therefore the VMM can obtain the priority of the vCPU. If there are a plurality of vCPUs, the plurality of vCPUs separately update the running entity table 32 before trapping in.

Because the vCPU has been swapped in after steps S604 and S604-*d*, an actual CORE ID of the physical core that runs the vCPU is recorded in the running entity table 32. In this case, the vCPU has not sunk in, in other words, the vCPU is out of service. However, in this embodiment, the vCPU is configured to immediately trap in after the running entity table is updated. Therefore, a meaning of the CORE ID recorded herein is consistent with the meaning of the CORE ID in Table 2.

Step S605 may be implemented by the scheduling execution unit 2812 in the host interrupt management unit 281. The scheduling execution unit 2812 needs to update the running entity table 32 in the initialization phase, and also needs to update the running entity table 32 each time after a vCPU is swapped in and before the vCPU traps in to a guest mode, and each time before a vCPU is swapped out, to ensure that an in-service or out-of-service state, of a vCPU, recorded in the running entity table 32 is accurate.

S606 and S606-*d*: The primary vCPU and the secondary vCPU trap in to a guest mode. During trap-in, the primary vCPU and the secondary vCPU read, from the memories separately corresponding to the primary vCPU and the secondary vCPU, attribute values that are corresponding to the interrupt receiving mode and the APIC operation mode and that are set in step S603; and modify registers separately corresponding to the primary vCPU and the secondary vCPU based on the attribute values. The registers modified herein are physical registers corresponding to the physical cores that run the vCPUs.

After trapping in to the guest mode, the primary vCPU and the secondary vCPU are initialized differently. Guest operating system (guest OS) initialization is performed for the primary vCPU, and only initialization of the second vCPU is performed for the secondary vCPU.

After a pre-initialization phase (S607 and S607-*d*) of a guest operating system and the secondary vCPU is completed, the initialization of the guest interrupt management unit 291 starts (S608 and S608-*d*). The initialization of the guest interrupt management unit 291 includes the following steps.

S609: The interrupt distribution unit 2912 obtains address information of the interrupt vector table 31 by using the configuration channel 33 provided by the interrupt configuration unit 2811 (this step needs to be performed only for the primary vCPU). The address information may be specifically a start address and an end address, in a memory, of the interrupt vector table 31.

S610: The interrupt distribution unit 2912 obtains a VM ID by using the configuration channel 33 provided by the interrupt configuration unit 2811, and stores the VM ID in a variable (this step needs to be performed only for the primary vCPU). Alternatively, the VM ID may not be obtained in some other embodiments.

S611: The interrupt distribution unit 2912 obtains a current vCPU ID, and stores the current vCPU ID in a variable. This step needs to be performed for both the primary vCPU and the secondary vCPU, and vCPU IDs are separately stored in variables of the primary vCPU and the secondary vCPU S612: The interrupt distribution unit 2912 configures an address of an entrypoint function of the guest interrupt management unit 291 to a register corresponding to each vCPU, so that after receiving an interrupt request, each vCPU may obtain and execute a function of the guest interrupt management unit 291 by directly reading the address of the entrypoint function in the register. In this embodiment, because the interrupt distribution unit 2912 works first, the entrypoint function of the guest interrupt management unit 291 is an entrypoint function of the interrupt distribution unit 2912 in this embodiment.

Different processors may have different rules for determining a register to be used to store an interrupt processing entrypoint function. In an X86 system, this may be implemented by modifying an interrupt descriptor table register (interrupt descriptor table register, IDTR) by using an lidt instruction. Specifically, an interrupt descriptor table (interrupt descriptor table, IDT) is loaded to the IDTR by using the lidt instruction. An address, in the IDT table, of an interrupt processing entrypoint function is filled with the entrypoint function of the interrupt distribution unit 2912. In an ARM64 system, this is implemented by modifying a register vbar_el1 (vector base address register el1) by using an msr instruction.

It should be noted that an "entrypoint function" of a program (a function unit or module) is a function that is first invoked when the program (or the function unit or module) runs. The "interrupt processing entrypoint function" is a function that includes a first instruction executed by a vCPU after the vCPU is interrupted by an interrupt request. For example, after the vCPU is interrupted by the interrupt request, the first instruction that needs to be executed by the vCPU is an instruction of the interrupt distribution unit 2912, and the interrupt processing entrypoint function should be set to the entrypoint function of the interrupt distribution unit 2912.

After the initialization of the guest interrupt management unit 291 is completed, the guest operating system enters a next phase of the initialization process (S613 and S613-*d*), until initialization of the guest operating system is completed. Further, the guest operating system enters a state in which an application (or a service) can run. Then the application may be deployed in the guest operating system, and the application may perform ISR registration by using an interface provided by the interrupt distribution unit 2912 (S614 and S614-*d*). During ISR registration, the interrupt distribution unit 2912 notifies the interrupt configuration unit 2811 by using the configuration channel 33. Then the vCPU traps out (S615). Then the interrupt configuration unit 2811 modifies the interrupt vector table 31, so as to fill registration information in the interrupt vector table 31. Then the vCPU immediately traps in again (S616).

A person skilled in the art should understand that, in a virtualized device, a function of each unit in a virtual machine may be understood as being implemented after a vCPU reads and executes a program or an instruction of the unit. For example, that the interrupt distribution unit 2912 notifies the interrupt configuration unit 2811 by using the configuration channel 33 may be considered as: The vCPU reads a program of the interrupt distribution unit 2912, and invokes a hypercall function of the configuration channel 33 according to the program (then the vCPU traps out to a host mode). Then a host (a host thread corresponding to the vCPU) reads a program of the interrupt configuration unit 2811, and modifies the interrupt vector table according to the program. After the modification is completed, the vCPU immediately traps in to the guest mode again. In addition, in this embodiment, the host interrupt management unit 281 is located in the VMM, and therefore an action performed by the host interrupt management unit 281 may also be understood as an action performed by the VMM. Regardless of whether an action is performed by a vCPU or a unit in a virtual machine, or an action is performed by a VMM or a unit in a host, the action is ultimately performed by a physical processor running a software program.

The interrupt configuration unit 2811 has written the configuration into a vCPU object created by the VMM (refer to step S603). Therefore, each time the vCPU traps in subsequently, a value of a physical register corresponding to the vCPU may be set based on the configuration, so as to achieve an effect that after trapping in, the vCPU directly receives all interrupt requests from the APIC without trapping out, and the vCPU may directly operate the physical APIC.

(3) Interrupt Request Processing Procedure

After the foregoing steps, the virtualized device has entered into a running state, and a virtual machine deployed on the virtualized device and an application on the virtual machine are running. The following describes in detail a procedure in which the virtualized device provided in this embodiment processes an interrupt request during running.

Figure 8A:
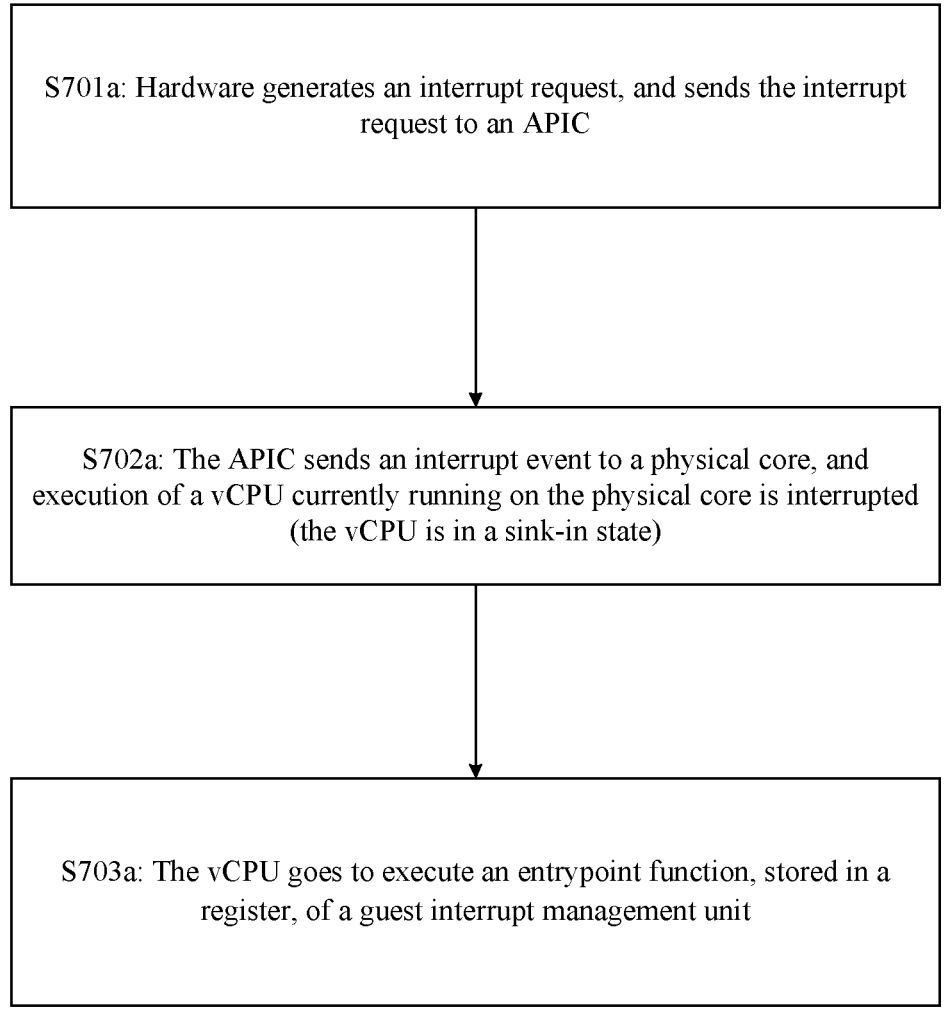
FIG. 8A and FIG. 8B are schematic flowcharts of an interrupt processing method according to an embodiment of the present invention.

As shown in FIG. 8A, first, hardware generates an interrupt request, and sends the interrupt request to the APIC 260 (S701a). For example, a hardware network interface card generates an interrupt request, and sends the interrupt request to the APIC 260. The APIC 260 sends the interrupt request to a physical core according to a specific rule, and execution of a vCPU running on the physical core in a guest mode is interrupted (S702a). The vCPU has been previously configured to be able to receive an interrupt in the guest mode without trapping out. Therefore, after the execution of the vCPU is interrupted, the vCPU directly goes to execute the entrypoint function of the interrupt distribution unit 2912 that is stored in the register, and sends the interrupt request to the interrupt distribution unit 2912 (S703a). In this way, functions of the guest interrupt management unit 291 progressively take effect. Some interrupt requests are sent to a plurality of physical cores by the APIC 260. A processing manner of each physical core is similar to the foregoing manner, and details are not described for each physical core one by one.

It should be noted that a process of sending an interrupt request may vary in different computer architectures. For example, in an X86 system, the APIC 260 includes an io-APIC and a local-APIC. The io-APIC is responsible for collecting all interrupt requests generated by hardware, and correspondingly sending the interrupt request to the local-APIC. Then the local-APIC forwards the interrupt requests to corresponding physical cores. In this embodiment, for simplification of description, this process is briefly described as sending, by the APIC 260, an interrupt request to a physical core.

It should be noted that, in this embodiment, if the interrupt request is sent to a physical core, but a vCPU of the physical core is out of service, in other words, the physical core is in a host mode and is running a function unit on the host, where the function unit is usually the VMM, the physical core (namely, the VMM) does not process the interrupt request, because an interrupt response bit of the host mode is disabled. A subsequent embodiment provides a compensation method, and describes how the VMM processes the interrupt request when the interrupt response bit of the host mode is not disabled.

Figure 8B:
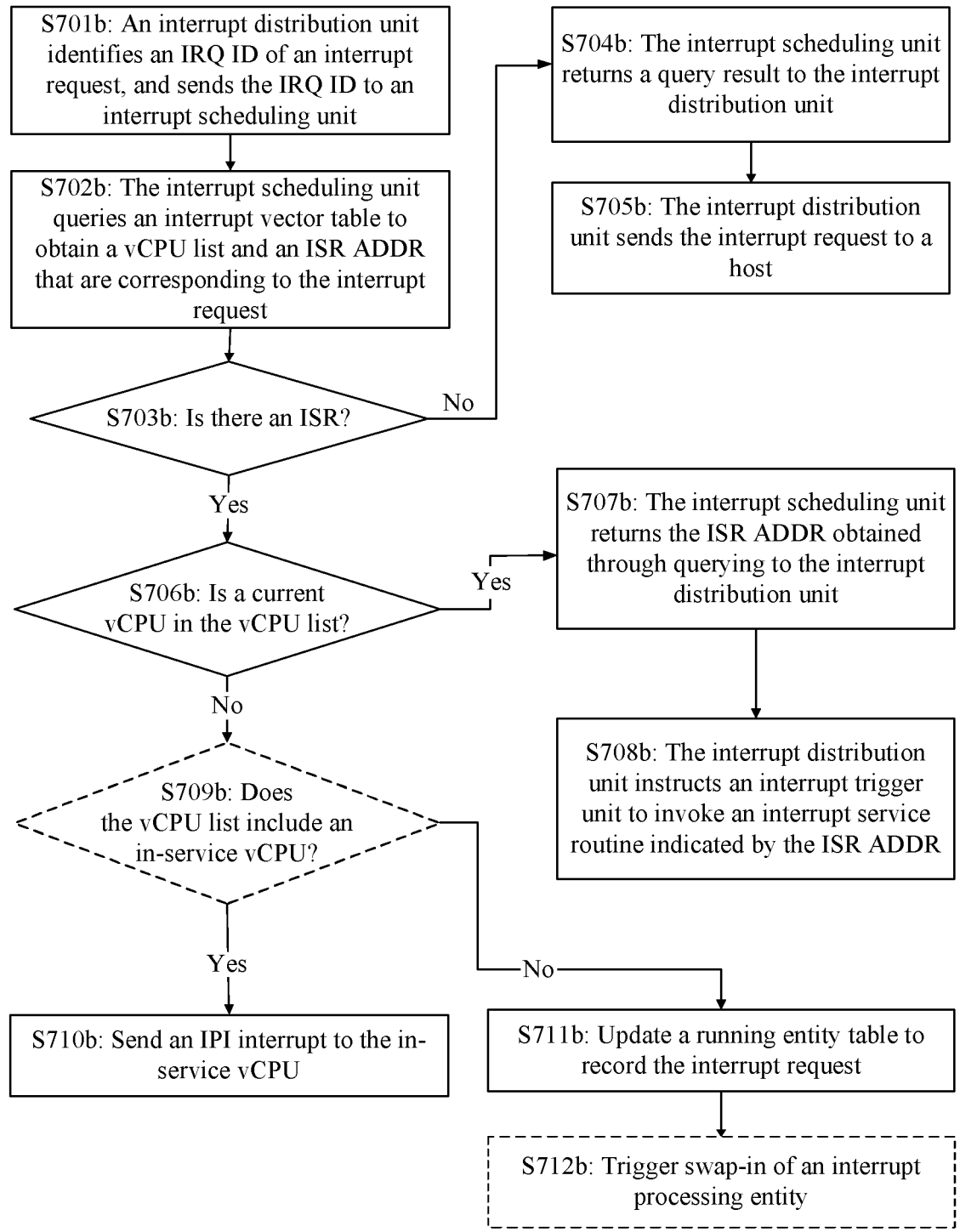

With reference to the foregoing step S703a, as shown in FIG. 8B, the interrupt distribution unit 2912 identifies an IRQ ID of the interrupt request, and sends the IRQ ID to the interrupt scheduling unit 2911 (S701b). The interrupt scheduling unit 2911 queries, from the interrupt vector table based on the IRQ ID, a processing entity of the interrupt request and an address of an ISR corresponding to the interrupt request, namely, a vCPU LIST and an ISR ADDR corresponding to the IRQ ID in the foregoing Table 1 (S702b). The interrupt scheduling unit 2911 determines whether an ISR ADDR can be obtained through querying (S703b).

If there is no ISR ADDR, it indicates that the interrupt request is neither an application interrupt request nor a guest operating system interrupt request, and the processing entity of the interrupt request is not a virtual machine. Therefore, the interrupt scheduling unit 2911 returns the query result to the interrupt distribution unit 2912 (S704b). Then the interrupt distribution unit 2912 injects the interrupt request into the host (S705b) by using the injection channel 34. Specifically, the interrupt distribution unit 2912 may send the interrupt request to the interrupt receiving unit 2813 in the host by using the injection channel 34. The interrupt receiving unit 2813 sends the interrupt request to the host interrupt distribution unit 282. Then the host interrupt distribution unit 282 invokes the ISR that is corresponding to the interrupt request and that is in the host. Processing performed by the host interrupt distribution unit 282 belongs to the prior art, and details are not described herein.

If there is an ISR ADDR, the interrupt scheduling unit 2911 determines whether the current vCPU (namely, the vCPU whose execution is interrupted) is included in the vCPU LIST obtained through querying, in other words, determines whether the current vCPU is one of processing entities of the interrupt request (S706b).

It should be noted that, in this embodiment, the interrupt vector table 31 stores an application interrupt request and a guest operating system interrupt request. Therefore, the foregoing methods may be used to determine a processing entity. In another embodiment, if content of the interrupt vector table 31 changes, a method for determining a processing entity may also adaptively change.

If the current vCPU is included in the vCPU LIST obtained through querying, the interrupt scheduling unit 2911 returns the ISR ADDR obtained through querying to the interrupt distribution unit 2912 (S707b). Then the interrupt distribution unit 2912 instructs the interrupt trigger unit 2913 to invoke an interrupt service routine indicated by the ISR ADDR (S708b), and the interrupt service routine is used to process the interrupt request. In this case, processing of the interrupt request is completed, and the vCPU returns to a location in which the execution of the vCPU is interrupted, and continues with the execution.

If the current vCPU is not included in the vCPU LIST obtained through querying, the running entity table 32 may be queried to determine whether the vCPU LIST includes an in-service vCPU (S709b).

If the current vCPU is not included in the vCPU LIST obtained through querying, and the vCPU LIST includes at least one in-service vCPU, the interrupt scheduling unit 2911 selects one vCPU from the in-service vCPU, and sends an IPI interrupt to the selected vCPU (S710b). The IPI interrupt carries an identifier of the interrupt request (IRQ ID), so that the selected vCPU processes the interrupt request. The selection herein may be random selection, or may be selecting a vCPU with a lowest priority based on priorities of all vCPUs in the vCPU LIST.

If the current vCPU is not included in the vCPU LIST obtained through querying, and none of vCPUs in the vCPU LIST is in service, the interrupt scheduling unit 2911 selects a target vCPU from the vCPU LIST, and updates the running entity table 32 (S711b). Specifically, the updating the running entity table 32 includes: recording a PENDING bit corresponding to the target vCPU in the running entity table 32, and recording a value of the bit as the IRQ ID of the interrupt request, so that the target vCPU processes the interrupt request. The "target vCPU" may include all vCPUs in the vCPU LIST, or may be a randomly selected vCPU. Further, in addition to updating the running entity table 32, the interrupt scheduling unit 2911 may actively trigger swap-in of the target vCPU (S712b), so that the interrupt request is processed as soon as possible. Which vCPU is to be selected as the target vCPU and whether to actively trigger swap-in of the vCPU may be determined based on a priority of the interrupt request and a priority of the vCPU. A specific method is described in detail in the following embodiment.

A procedure of processing the interrupt request by the "target vCPU" specifically includes: After the target vCPU is swapped in by the host and before the target vCPU traps in to a guest mode, the scheduling execution unit 2812 in the host reads the PENDING bit in the running entity table 32, and sends, to the target vCPU, an interrupt request that has a same IRQ ID as the interrupt request, so that the target vCPU may process the interrupt request after trapping in to the guest mode. There may be one or more "target vCPUs". If the interrupt request needs to be processed only by one vCPU, after an interrupt is sent to a first target vCPU, a PENDING bit corresponding to another vCPU is cleared, to prevent the another vCPU from processing the interrupt again after trapping in.

It should be noted that, after a vCPU receives an interrupt request, the vCPU may further need to store a status of an interrupted task and perform some other operations, so that after processing of the interrupt request is completed, the vCPU can return to continue to perform the interrupted task. These belong to a conventional process of interrupt processing, and details are not described herein in this embodiment.

In some other embodiments, if determining that the current vCPU is not included in the vCPU LIST obtained through querying, the interrupt scheduling unit 2911 may directly update the running entity table 32, to set PENDING bits of all vCPUs included in the vCPU LIST to the IRQ ID of the interrupt request.

It can be learned from the foregoing embodiments that the interrupt receiving mode is configured for the vCPU, so that the vCPU may directly receive, in the guest mode, nearly all interrupt requests sent by the APIC, in other words, an interrupt may be directly sent to the guest interrupt management unit 291 of the virtual machine. Therefore, the vCPU does not need to be switched, for example, trap in/trap out, when processing an application interrupt request, and a service-layer interrupt request such as an application interrupt request has a shorter response and processing path, and a processing delay of an application interrupt request is reduced. The method provided in this application can ensure an ultra-low response and processing delay requirement of a service interrupt request in an execution environment with a high service capacity and high concurrency, and may be further applied to a service scenario that needs to be based on an ultra-low delay, such as 5G (5th-Generation).

Further, a non-service-layer interrupt request is injected into the host layer by using the injection channel 34. Then the host interrupt management unit 281 and/or the host interrupt distribution unit 282 in the host perform/performs processing or further distribution. This ensures efficient processing of an application interrupt request, and also ensures timely processing of another interrupt request.

Further, when a vCPU receiving an interrupt request is not a processing entity of the interrupt request, the interrupt request is recorded in the running entity table 32 shared by a plurality of vCPUs, and a target vCPU may view and process the interrupt request after being swapped in. This avoids a process of forwarding the interrupt request by the VMM, and further improves processing efficiency of the interrupt request. In addition, a temporarily out-of-service vCPU may delay receiving and processing an interrupt request. This effectively avoids a loss of an interrupt request in a scenario in which a plurality of vCPUs share a core and a vCPU does not exclusively occupy a core.

Further, when a vCPU receiving an interrupt request is not a processing entity of the interrupt request, the running entity table is updated, and swap-in of a processing entity of the interrupt request may be further triggered. This further improves processing efficiency of the interrupt request.

As described in step S702a of the foregoing embodiment, after receiving an interrupt request, the APIC sends the interrupt request to one (or more) physical core according to a specific rule, and vCPU running on the physical core processes the interrupt request. If no special rule is set, for example, the APIC randomly sends an interrupt request or sends an interrupt request according to the prior art, in an excessive allocation scenario (a plurality of vCPUs share one core), an interrupt request may be probably sent to a vCPU that cannot process the interrupt request. Therefore, the following embodiment provides a method for configuring interrupt affinity, so that an interrupt request can be sent, at a maximum probability, to a currently in-service vCPU that can process the interrupt, without performing steps such as the foregoing steps S709b and S710b. This further improves interrupt processing efficiency.

As an attribute of an interrupt controller, the interrupt affinity is stored in the interrupt controller, and represents an affinity between an interrupt request and a physical core. An interrupt request is sent by the interrupt controller to a physical core that has an affinity with the interrupt request. Specifically, an affinity of an interrupt request may be implemented as an affinity list corresponding to the interrupt, and the affinity list includes CORE IDs of all physical cores that can receive the interrupt request. For example, in an X86 system, when there is one io-APIC, that is, all hardware that generates interrupt requests is connected to the io-APIC, interrupt affinities of all interrupt requests are stored in the io-APIC; or when there are a plurality of peripheral interrupt control components, interrupt affinities of interrupt requests generated by different hardware are stored in different interrupt control components, and the interrupt affinities may be separately updated according to manners described in the following embodiments.

Figure 9A:
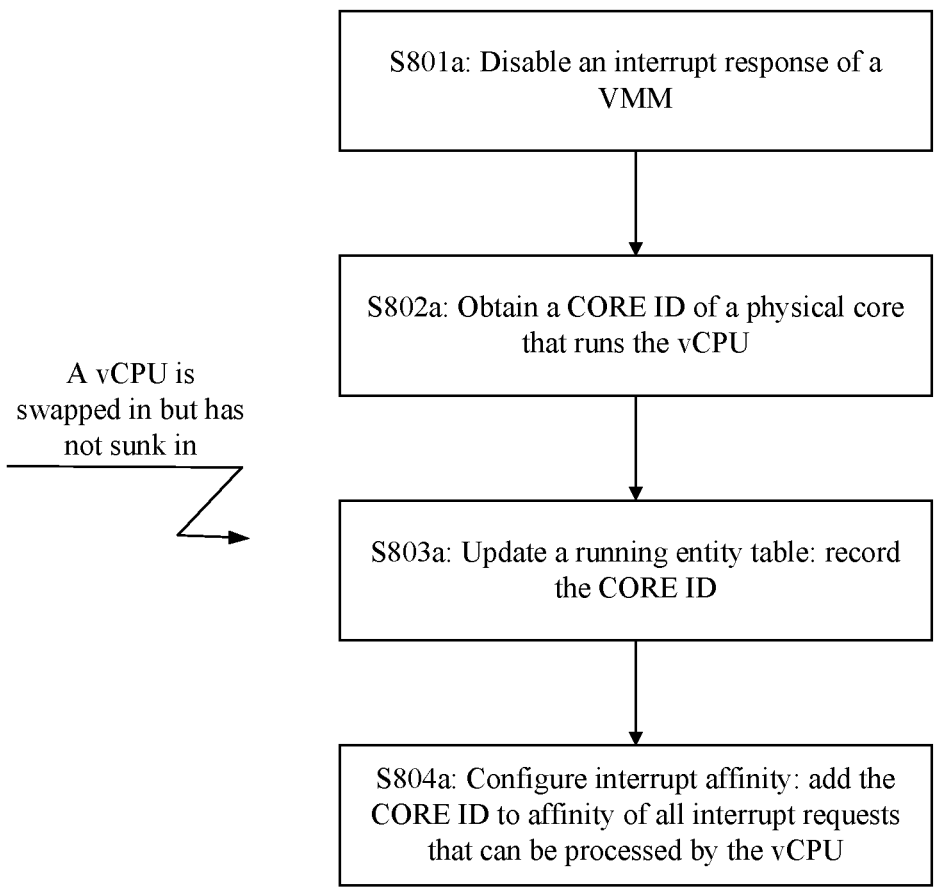
FIG. 9A and FIG. 9B are schematic flowcharts of configuring interrupt affinity according to an embodiment of the present invention.
Figure 9B:
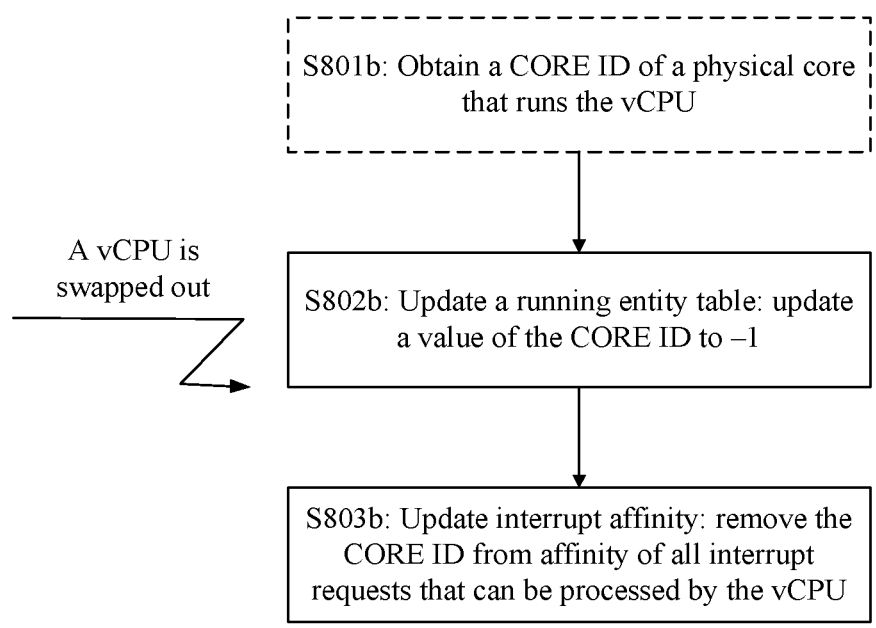

In this embodiment, configuration of interrupt affinity is performed after a vCPU is swapped in by the VMM and before the vCPU traps in to a guest mode; and is performed when the vCPU is swapped out by the VMM. The configuration may be implemented by the scheduling execution unit 2812 in the host interrupt management unit 281. FIG. 9A and FIG. 9B describe a process of configuring interrupt affinity.

Referring to FIG. 9A, after a vCPU is swapped in and before the vCPU traps in to a guest mode, the scheduling execution unit 2812 disables an external interrupt response of the VMM (S801a). Specifically, a register bit of the vCPU in a host mode is modified to instruct to disable an external interrupt, so that the VMM cannot receive or process an interrupt request. Then a CORE ID of a physical core that runs the vCPU is obtained by invoking a function (S802a). For example, in a Linux system, a CORE ID is obtained by invoking an smp_processor_id( ) function. The register bit herein is a bit i of a current program status register (cprs) in an ARM64 architecture, and is implemented by using a cli instruction in an X64 architecture.

Certainly, because the vCPU is swapped in, the running entity table also needs to be updated in this case. Specifically, a VM ID and a vCPU ID to which the vCPU belong, and the CORE ID are recorded in the running entity table (S803a).

In addition to updating the running entity table, to implement the configuration of the interrupt affinity, the scheduling execution unit 2812 first obtains, from the interrupt vector table based on the vCPU ID, all interrupt requests (no IPI needs to be set) that can be processed by the vCPU, then accesses the APIC, and adds the physical core (namely, the previously obtained CORE ID) that runs the vCPU to affinities of the interrupt requests in APIC (S804a), so that the APIC may send the interrupt requests to the physical core after receiving the interrupt requests.

It should be noted that, in a scenario in which a vCPU is bound to a core, the affinity configuration operation in S804a may be performed when a VM starts and the vCPU is swapped in for the first time, the interrupt controller does not need to be modified each time the vCPU is swapped in, because a physical core that runs the vCPU is fixed.

Before the vCPU traps in, the scheduling execution unit 2812 further needs to query for the running entity table 32. If it is found that a value of a PENDING bit is not −1, it indicates that an interrupt request is unprocessed. Then the scheduling execution unit 2812 actively sends, to the vCPU based on an IRQ ID of the PENDING bit, an interrupt request that has a same characteristic. Because interrupt receiving of the host mode (or the host) is disabled, the vCPU can receive and process the interrupt request only after trapping in.

FIG. 9A and the foregoing content have described that interrupt affinity needs to be updated when a vCPU is to trap in. Correspondingly, interrupt affinity also needs to be updated when a vCPU is to be swapped out. Referring to FIG. 9B, after a vCPU traps out and before the vCPU is swapped out by the VMM, the scheduling execution unit 2812 obtains a CORE ID of a physical core that runs the vCPU (S801b), and then updates an entry, of the CORE ID, that is corresponding to a vCPU ID of the vCPU and that is in the running entity table 32 to −1 (S802b). In addition to updating the running entity table 32, configuration of interrupt affinity also needs to be updated (S803b). Specifically, the scheduling execution unit 2812 first obtains, from the interrupt vector table 31 based on the vCPU ID, all interrupt requests (no IPI needs to be set) that can be processed by the vCPU, then accesses the APIC, and removes a physical core that runs the vCPU from affinities of the interrupt requests in the APIC. If an affinity list of an interrupt request is empty, the affinity list is filled with −1. This means that all physical cores may receive the interrupt request. In another embodiment, step S801b may alternatively not be performed. The to-be-modified CORE ID can also be found by using the vCPU ID in some manners.

It should be noted that, in a scenario in which a vCPU is bound to a core, the operation in S803b may be performed only once after the VM exits.

After the affinity is configured by using the foregoing method, necessity of distributing some interrupt requests between vCPUs is eliminated. Therefore, in a scenario in which a vCPU is not bound to a core, an interrupt request can hit a target vCPU at a maximum probability, thereby further shorting a time for processing an interrupt request and reduce an interrupt delay.

With reference to the foregoing embodiment in FIG. 8B, after the interrupt affinity is set, if determining that the current vCPU is not included the vCPU LIST (S706b), the interrupt scheduling unit 2911 does not need to perform step S709b, because all vCPUs are out of service. Step S710 does not need to be performed either. The interrupt scheduling unit 2911 may directly continue with processing based on a case in which all vCPUs in the vCPU LIST are out of service.

In the foregoing embodiment, when a vCPU receiving an interrupt request is not a processing entity of the interrupt request, and none of processing entities is in service, a target vCPU to process the interrupt request needs to be determined from the processing entities of the interrupt request. The following embodiment describes in detail how to determine the target vCPU, and how the target vCPU processes the interrupt request after the target vCPU is determined. The method provided in this embodiment may be applied to an embodiment in which no interrupt affinity is configured, or may be applied to an embodiment in which interrupt affinity is configured.

Table 1 and Table 2 record a priority of an interrupt request and a priority of a vCPU respectively. When it is determined that a vCPU receiving an interrupt request is not a processing entity of the interrupt request, the interrupt scheduling unit 2911 queries Table 1 to obtain a priority of the interrupt request.

In this embodiment, then a value of a priority of an interrupt request is greater than or equal to 0, the priority of the interrupt request needs to be compared with a priority of an in-service vCPU, to determine whether to preempt the in-service vCPU. When the value is a negative number, the priority of the interrupt request does not need to be compared with the priority of the in-service vCPU. Specifically, when the value is −1, the in-service vCPU is never preempted; or when the value is −2, a current vCPU currently receiving the interrupt request is directly preempted. An interrupt priority is −2 by default. There are many manners of setting and determining a priority, and the manners are not listed one by one in this application. The following method is described merely by using this manner as an example.

In addition, the priority of a vCPU herein is a priority of a current task on the vCPU. During initialization, the interrupt scheduling unit 2911 registers a task handover HOOK of the guest operating system, and the guest operating system executes the HOOK upon task handover. The HOOK is used to update a priority of a to-be-swapped-in task of the guest operating system to PRIORITY in Table 2.

Detailed descriptions of the method are as follows.

When the priority of the interrupt request is −1, it indicates that the priority of the interrupt request is extremely low, and the priority of the interrupt request is not compared with the priority of the in-service vCPU, and a PENDING bit may be directly recorded as described above.

When the priority of the interrupt request is greater than or equal to 0, and it is determined that priorities of all in-service vCPUs are higher than or equal to the priority of the interrupt request, the interrupt scheduling unit 2911 uses, based on Table 1, all vCPUs in a vCPU LIST corresponding to the interrupt request as target vCPUs, and then modifies PENDING bits that are corresponding to the target vCPUs and that are in Table 2 to an IRQ ID of the interrupt request. In this way, before any vCPU in the vCPU LIST traps in, the scheduling execution unit 2812 can find, through querying, that an interrupt request of a corresponding PENDING bit is unprocessed, and then send a same interrupt request to the vCPU. The vCPU may receive and process the interrupt request after trapping in. Unless the interrupt request is an interrupt request that needs to be processed by a plurality of cores, if the interrupt request is sent to one vCPU, a PENDING bit of another vCPU needs to be cleared. This prevents all vCPUs from repeatedly processing the interrupt request.

When the priority of the interrupt request is greater than or equal to 0, and it is determined that a priority of any vCPU is lower than the priority of the interrupt request, the interrupt scheduling unit 2911 selects a vCPU with a lowest priority as a "transit vCPU", selects a vCPU with a highest priority from a vCPU LIST corresponding to the interrupt request as a target vCPU, and modifies a PENDING bit that is corresponding to the target vCPU and that is in Table 2 to an IRQ ID of the interrupt request. Then the interrupt scheduling unit 2911 instructs the interrupt distribution unit 2912 to send an IPI interrupt to the transit vCPU (in other words, a current vCPU sends an IPI interrupt to the transit vCPU), where the IPI interrupt carries a vCPU ID of the target vCPU. The IPI interrupt may further carry an IRQ ID of the to-be-processed interrupt request, but this is not mandatory, because the IRQ ID of the to-be-processed interrupt request has been recorded in the PENDING bit of the target vCPU in the foregoing step. If the IRQ ID is not recorded in the foregoing step of the method, the IRQ ID needs to be carried herein, so that the swapped-in target vCPU knows that the target vCPU needs to process the interrupt request.

Because the transit vCPU is selected from the in-service vCPUs, the transit vCPU is currently in service. After receiving the IPI interrupt, the transit vCPU executes an ISR corresponding to the IPI interrupt (the ISR is also registered in Table 1, and may be registered by the interrupt trigger unit 2913). An implementation of the ISR corresponding to the IPI interrupt is: When it is determined that the vCPU ID of the target vCPU carried in the IPI interrupt is different from a vCPU ID of the transit vCPU (like the case in this embodiment), reverse injection is performed on the interrupt receiving unit 2813 of the host by using the injection channel 34, where a parameter is the vCPU ID of the target vCPU (optionally, the parameter may further include the IRQ ID). After injection, the transit vCPU traps out. After receiving the injection, the interrupt receiving unit 2813 determines that the injection carries the vCPU ID of the target vCPU (indicating that a processing entity of the interrupt request is not the host), and therefore sends the vCPU ID of the target vCPU to a scheduler that is in the VMM and that is used to perform vCPU scheduling, so that the VMM swaps in the target vCPU and swaps out the transit vCPU.

It should be noted that the transit vCPU is swapped out herein because the transit vCPU is a vCPU with a lowest priority in this embodiment, and swapping out the transit vCPU can minimize impact of the interrupt request on a current task. In another embodiment, another vCPU may be swapped out depending on a situation. This is not limited in this application.

After the target vCPU is swapped in and before the target vCPU traps in to a guest mode, the scheduling execution unit 2812 queries for a PENDING bit in the running entity table 32, determines that the target vCPU has an unprocessed interrupt request, and actively sends, to the target vCPU, an interrupt request that is the same as the unprocessed interrupt request, so that the target vCPU processes the interrupt request after trapping in to the guest mode.

When the priority of the interrupt request is −2, it indicates that the interrupt request is very urgent, and the priority of the interrupt request does not need to be compared with a priority of a vCPU either. The interrupt scheduling unit 2911 immediately selects a vCPU with a highest priority (or randomly selects a vCPU) from the vCPU LIST as a target vCPU, and then invokes an ISR (carrying a vCPU ID of the target vCPU) that is corresponding to the IPI and that is in Table 1. A specific implementation of the ISR is: If it is determined that the vCPU ID of the target vCPU is different from that of a current vCPU, reserve injection is performed on the interrupt receiving unit 2813 of the host by using the injection channel 34, where a parameter is the target vCPU ID. After injection, the current vCPU immediately traps out. After receiving the reverse injection, the interrupt receiving unit 2813 determines that the injection carries the vCPU ID of the target vCPU (indicating that a processing entity of the interrupt request is not the host), and sends the vCPU ID of the target vCPU to a scheduler that is in the VMM and that is used to perform vCPU scheduling, so that the VMM swaps in the target vCPU and swaps out the current vCPU. Similar to that in the foregoing method, an IRQ ID may be carried, or may not be carried.

It can be learned that, when priorities of current tasks on all in-service vCPUs are higher than or equal to the priority of the interrupt request, temporarily, none of these vCPUs can be swapped out. To avoid impact on running of the current tasks, swap-out and swap-in of a vCPU cannot be actively triggered. Therefore, the interrupt request is first recorded, and is processed after one of target vCPUs is swapped in at a proper time. When the priority of the interrupt request is relatively high or very high, a vCPU with a low priority may be actively preempted. In this way, processing of the interrupt request is accelerated while impact on a current task of a vCPU is minimized. In a process of implementing the method, statues and priorities of all vCPUs in an entire system are learned by using the running entity table 32. Therefore, such management is at a system level, and can ensure normal running of the system to some extent.

The foregoing embodiment has described sending an IPI interrupt to another vCPU by one vCPU. The following embodiment describes in detail how one vCPU sends an IPI interrupt to another vCPU. The two vCPUs may be located in a same VM, or may be located in different VMs. For ease of description, the two vCPUs are referred to as a vCPU A and a vCPU B in the following embodiment. For a part in which an IPI interrupt is used in the foregoing embodiment, correspondingly refer to this embodiment.

If the vCPU A is in a guest mode, after determining that the vCPU A needs to send an IPI interrupt to the vCPU B, the vCPU A invokes an IPI sending function in an interrupt distribution unit 2912 in a VM to which the vCPU A belongs. The interrupt distribution unit 2912 instructs an interrupt scheduling unit 2911 to perform scheduling. The interrupt scheduling unit 2911 searches a running entity table 32 for a CORE ID entry corresponding to the vCPU B, to determine whether the vCPU B is in service.

If determining that the vCPU B is in service, the interrupt scheduling unit 2911 directly operates an APIC to send an IPI interrupt to a physical core that runs the vCPU B. The transit vCPU described in the foregoing embodiment is a vCPU selected from in-service vCPUs, and therefore is applicable to this step. For example, in an X86 system, the interrupt scheduling unit 2911 directly operates a local-APIC corresponding to a physical core that runs the vCPU A to send an IPI interrupt to a local-APIC corresponding to the physical core that runs the vCPU B.

If it is determined that the vCPU B is out of service, the IPI interrupt is recorded in a vCPU B-related PENDING bit in the running entity table 32, so that the vCPU B processes the IPI interrupt after being swapped in. Specifically, after the vCPU B is swapped in and before the vCPU B traps in, the vCPU B queries for the PENDING bit, then sends a same IPI interrupt to the vCPU B itself, and processes the IPI interrupt after trapping in.

It should be noted that, although the IPI interrupt request is a special interrupt, a processing procedure of the IPI interrupt request is partially similar to the interrupt request in the foregoing embodiment. Therefore, reference may be made to the foregoing embodiment. Details are not described herein again.

The running entity table is shared among different vCPUs, and a vCPU is configured during initialization in the foregoing embodiment, so that the vCPU may directly operate an interrupt controller to send an IPI interrupt without trapping out, and an IPI interrupt processing is accelerated.

The foregoing steps may be applied to any IPI interrupt request.

Further, if the sent IPI is of a same type as the IPI used in the foregoing embodiment, the IPI carries an IRQ ID, or may carry both an IRQ ID and a vCPU ID. The carried vCPU ID may not necessarily be an ID of the vCPU B. The IRQ ID means that the IPI is used to instruct another vCPU to process an interrupt request indicated by the IRQ ID. The vCPU ID indicates a vCPU that needs to process the interrupt request (namely, the target vCPU in the foregoing embodiment).

Correspondingly, after receiving the IPI interrupt, the vCPU B queries Table 1 to invoke an ISR corresponding to the IPI interrupt to process the IPI interrupt. A specific implementation of the ISR is: If it is determined that the carried vCPU ID is the same as the ID of the vCPU B or there is no vCPU ID (indicating that the vCPU B is a processing entity of the interrupt request), the vCPU B queries Table 1 to invoke an ISR corresponding to the carried IRQ ID to process the interrupt request; or if it is determined that the carried vCPU ID is different from the ID of the vCPU B, the vCPU B sends the vCPU ID of the target vCPU to the host by using the injection channel 34. Then the vCPU B traps out. The host sends the vCPU ID to the scheduler that is used to perform vCPU scheduling and that is in the VMM, so that the VMM swaps in the vCPU indicated by the vCPU ID. For a specific process, refer to the foregoing embodiment that includes priority configuration.

If one vCPU expects to send an IPI interrupt to another vCPU without trapping out, the host needs to configure an interrupt controller operation mode for the vCPU, so that the vCPU may operate the interrupt controller to send an IPI interrupt to the another vCPU without trapping out. For a specific configuration method, refer to the foregoing embodiment.

A type of interrupt request needs to be processed by a plurality of vCPUs, and specifically, may be represented by TYPE=1 in Table 1. Typical examples are a clock interrupt, and an N2N peripheral interrupt in an ARM64 architecture. If a physical CPU is excessively allocated, this type of interrupt may not arrive at each vCPU that needs to process the interrupt request, because these vCPUs may not be in service at the same time. In this case, this interrupt needs to be forwarded in a manner of "replication". The following embodiment describes an "interrupt replication" method provided in this application.

Figure 10:
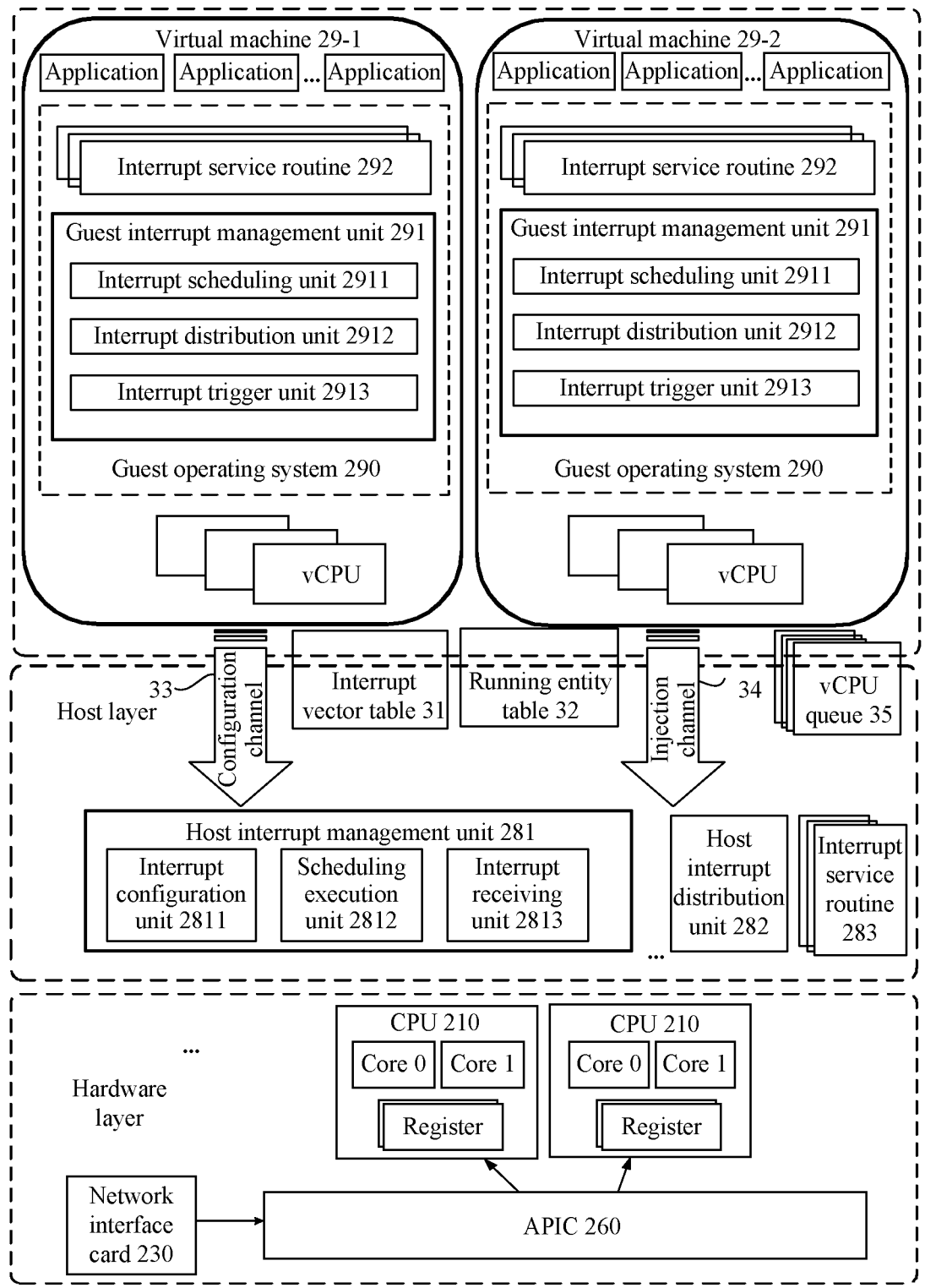
FIG. 10 is a second schematic diagram of function units and modules of a virtualized network device according to an embodiment of the present invention.

As shown in FIG. 10, a vCPU queue 35 shared by a host and a virtual machine is introduced for each physical core. A vCPU queue 35 of a physical core includes a vCPU previously running on the physical core. If a vCPU is swapped out from the physical core by the VMM, the scheduling execution unit 2812 adds the vCPU to the vCPU queue 35. If the vCPU is scheduled by the VMM to another physical core for running, the scheduling execution unit 2812 deletes the vCPU from the vCPU queue 35.

First, initialization is performed. Specifically, during initialization of the host interrupt management unit 281, a corresponding vCPU queue 35 is created for each physical core. These queues are stored in a storage area that can be shared by the host and the virtual machine. Each vCPU registers, to the interrupt vector table 31, a TYPE=1 interrupt request that the vCPU expects to process. For a detailed registration process, refer to the process of registering an interrupt request by an application in the foregoing embodiment.

Figure 11:
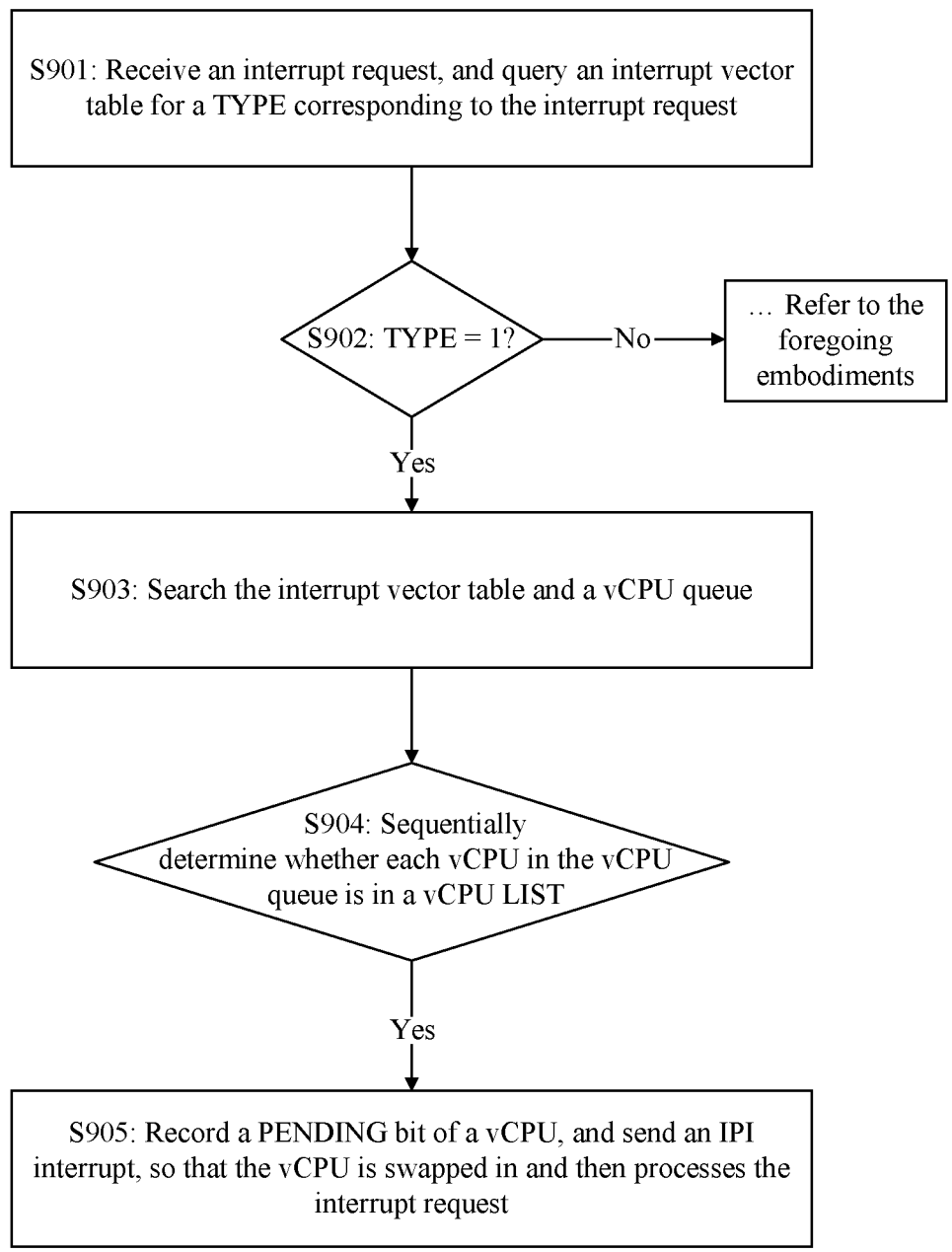
FIG. 11 is a schematic flowchart of an interrupt replication processing method according to an embodiment of the present invention.

For a vCPU in a guest mode, after receiving an interrupt request that needs to be processed by the vCPU, the vCPU may directly process the interrupt request (including directly operating the physical interrupt controller to initiate new timeout waiting). For a processing method, refer to the foregoing embodiment. In addition, referring to FIG. 11, in this embodiment, the interrupt scheduling unit 2911 further needs to query for a TYPE entry in the interrupt vector table based on an IRQ ID of the interrupt request (S901), and determine whether a value of the TYPE entry is 1 (S902). When it is determined that the interrupt request needs to be processed by a plurality of vCPUs, the interrupt vector table 31 and a vCPU queue 35 of a physical core that runs the vCPU are searched (S903), and it is sequentially determined whether a vCPU in the vCPU queue 35 is in a vCPU LIST corresponding to the IRQ ID (S904). If the vCPU is in the vCPU LIST, a PENDING bit corresponding to the vCPU is recorded in the running entity table 32, a transit vCPU is determined, an IPI interrupt is sent to the transit vCPU to finally enable the VMM to schedule the vCPU, and the vCPU processes the interrupt request after being scheduled and swapped in (S905). For more detailed content about triggering swap-in of a vCPU, refer to the foregoing embodiment.

An interrupt processing delay of an interrupt request that needs to be processed by a plurality of vCPUs can be reduced by setting a cross-layer shared vCPU queue for each physical CPU. A clock interrupt is used as an example. The clock interrupt is a special and very important interrupt for an operating system. If the clock interrupt can be directly received by a vCPU in a guest mode, a response time of the clock interrupt can be greatly shortened, and precision of the clock interrupt can also be greatly improved. For example, currently, a vCPU usually needs to trap out and trap in for receiving an interrupt request, and an interrupt delay is greater than 10 μs. This means that it is impossible to set a 5-μs clock interrupt (perform a light-weight event, such as an event consuming 300 ns, at a frequency of 5 μs). According to the method provided in the embodiments of the present invention, a clock interrupt can be directly received in a guest mode, and a plurality of vCPUs may periodically receive and process a clock interrupt. This greatly reduces a delay of the clock interrupt, and makes the setting possible.

In some of the foregoing embodiments, the interrupt response of the VMM is disabled each time a vCPU is swapped in. However, in some complex virtualized computer systems, the interrupt response is not allowed to be disabled. The following embodiment provides a compensation mechanism for such a system to accelerate processing of an application interrupt request.

Figure 12:
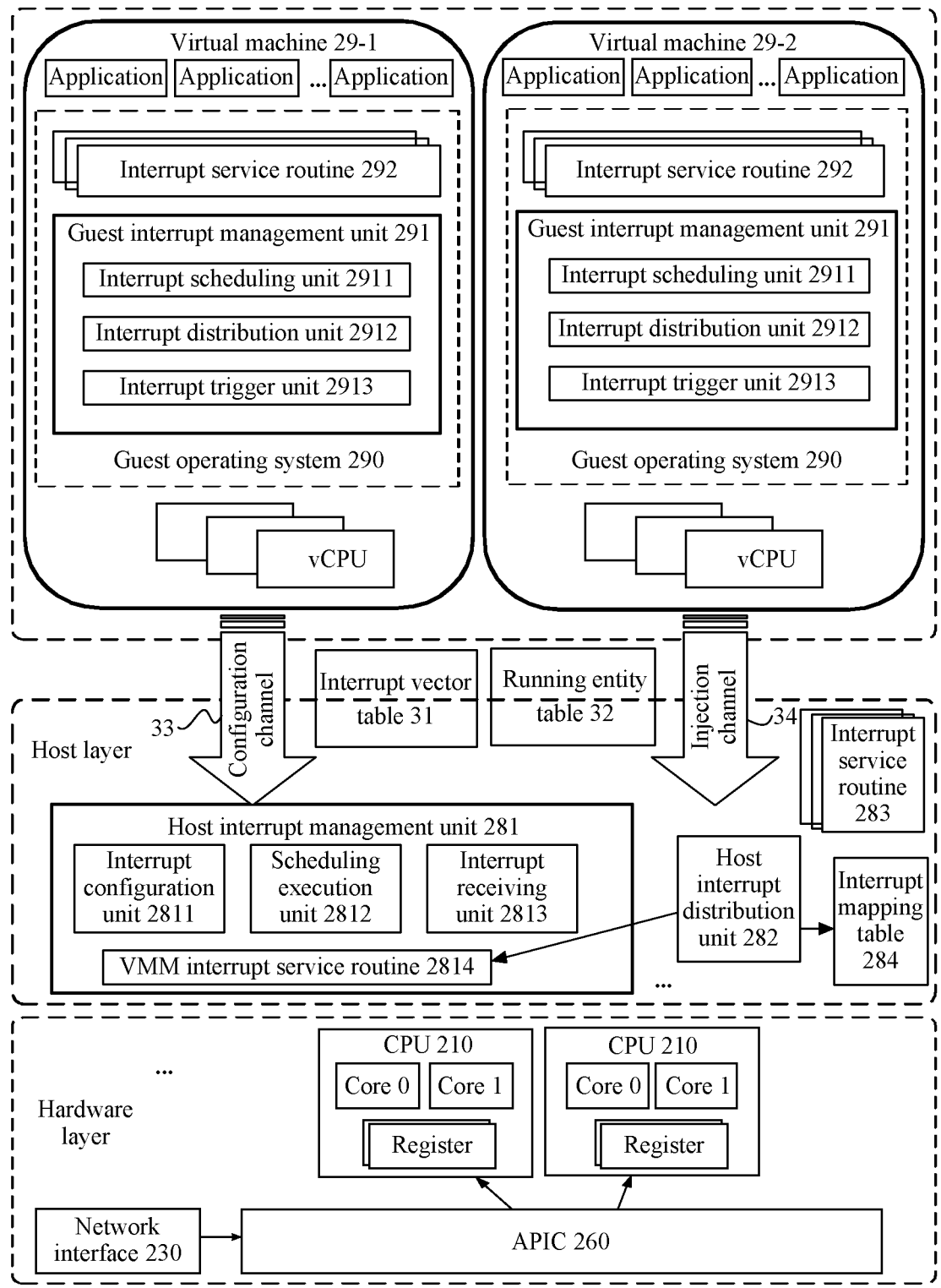
FIG. 12 is a third schematic diagram of function units and modules of a virtualized network device according to an embodiment of the present invention.

Referring to FIG. 12, an interrupt mapping table 284 and a VMM interrupt service routine 2814 are added at the host layer. The VMM interrupt service routine 2814 is registered with the interrupt mapping table 284, so that after receiving an application interrupt request, the VMM may find the VMM interrupt service routine 2814 by searching the interrupt mapping table 284.

In the host mode (for example, a vCPU traps out due to an exception), other code of the VMM or the host receives an application interrupt request, and the application interrupt request then enters the host interrupt distribution unit 282. The host interrupt distribution unit 282 queries the interrupt mapping table 284 to invoke a processing function corresponding to the application interrupt request, namely, the VMM interrupt service routine 2814. Then the VMM interrupt service routine 2814 performs the following actions based on the interrupt vector table 31 and the running entity table 32:

If none of vCPUs in a vCPU LIST corresponding to the application interrupt request is in service, refer to the processing manner of modifying a PENDING bit in the foregoing embodiments. PENDING bits of all vCPUs may be modified, or processing may be performed based on an interrupt priority with reference to the foregoing embodiments. In this way, a vCPU may process the interrupt request after being swapped in. If a related vCPU is in service, an IPI may be sent to the in-service vCPU according to the foregoing embodiment, to perform interrupt processing.

A person skilled in the art may understand that functions of the VMM interrupt service routine 2814 are similar to some functions of the guest interrupt management unit 291 in the foregoing embodiments. Therefore, for more specific implementations, refer to the foregoing embodiments. A structure and a type of the interrupt vector table may be the same as those of the interrupt mapping table. In this application, the two tables are named differently to distinguish between the two tables. Terms "vector" and "mapping" are not intended to constitute a limitation.

The VMM interrupt service routine 2814 is registered in the interrupt mapping table 284 of the host, and the functions of the VMM interrupt service routine 2814 are implemented when the application interrupt request is received, so that even if the application interrupt request is received in the host mode, a vCPU may use, without trapping in, an invention mechanism similar to that of other embodiments, to guide the application interrupt request to a corresponding vCPU for processing. In this way, the solutions provided in this application may be applied to a complex computer system in which interrupt processing definitely needs to be enabled in a host mode. Certainly, processing of a guest operating system interrupt request may also achieve a same effect.

With development of network technologies, 5G is to become a mainstream technology in the future. In a 5G scenario, a stricter requirement is imposed on a service interrupt delay of a network device. The method provided in this application can ensure an ultra-low response and processing delay of a service interrupt request in an execution environment with a high service capacity and high concurrency, and may be further applied to a service scenario using an ultra-low delay as system support, such as 5G.

It should be noted that the unit or module division in the foregoing embodiments is merely an example, the described functions of the units are merely examples for description, and this application is not limited thereto. A program design person may combine functions of two or more units depending on a requirement, or split a function of a unit to obtain more finer-grained units, and may use another variation manner.

For a same or similar part described in the foregoing embodiments, refer to each embodiment.

The described apparatus embodiments are merely examples. The units described as separate parts may or may not be physically separated, and parts shown as units may or may not be physical units, may be located in one position, or may be distributed on a plurality of network units. Some or all the modules may be selected depending on actual needs to achieve the objectives of the solutions of the embodiments. In addition, in the accompanying drawings of the apparatus embodiments provided by the present invention, connection relationships between modules indicate that the modules have communication connections to each other, which may be specifically implemented as one or more communications buses or signal cables. A person of ordinary skill in the art may understand and implement the embodiments of the present invention without creative efforts.

According to the descriptions of the foregoing embodiments, a person skilled in the art may clearly understand that the apparatus described in the embodiments of the present invention may be implemented by software and required general-purpose hardware, or certainly may be implemented by dedicated software such as an application-specific integrated circuit, a dedicated CPU, a dedicated memory, and a dedicated component. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit.

The foregoing descriptions are merely some specific embodiments of the present invention, and the protection scope of the present invention is not limited thereto.

What is claimed is:

1. A virtualized device, comprising:
 a hardware layer;
 a host layer implementing a host; and
 a virtual machine layer including a virtual computer, the virtual computer comprising one or more virtual processors serving the virtual computer;
 wherein the host is configured to configure the one or more virtual processors of the virtual computer to receive an interrupt request from the hardware layer;
 wherein the virtual computer is configured to:
   receive an interrupt request from the hardware layer;
   determine a processing entity of the interrupt request based on information; and
   based on determining that the processing entity of the interrupt request comprises a current virtual processor of the virtual computer, invoke, based on the information, an interrupt service routine corresponding to the received interrupt request to process the interrupt request, the information further comprising a correspondence between the interrupt request, the processing entity, and the interrupt service routine;
 wherein the host is further configured to configure the one or more virtual processors of the virtual computer to operate a physical interrupt controller; and
 wherein based on determining that the processing entity of the interrupt request is another virtual processor and the another virtual processor is in service, the virtual computer is further configured to operate the physical interrupt controller to send an inter-processor interrupt (IPI) request to the another virtual processor, the IPI request carrying an identifier of the interrupt request, and the another virtual processor does not comprise the current virtual processor of the virtual computer;

wherein the virtual computer is further configured to:
based on no other virtual processors being in service, record the interrupt request in a storage area that can be shared by all the other virtual processors, wherein in response to a priority of the interrupt request being lower than or equal to priorities of all in-service virtual processors, only the identifier of the interrupt request is recorded without targeting a specific virtual processor;

determine a transit virtual processor from the other virtual processors; and send an IPI request to the transit virtual processor, whereby the transit virtual processor traps out; and wherein the host is further configured to swap in one of the other virtual processors corresponding to the interrupt request for processing the interrupt request.

2. The virtualized device according to claim 1, wherein the virtual computer is further configured to:
determine a target virtual processor from one or more other virtual processors when the processing entity of the interrupt request is the one or more other virtual processors and none of the one or more other virtual processors is in service; and record an identifier of the interrupt request in a storage area accessible to both the current virtual processor and the host, wherein the one or more other virtual processors do not comprise the current virtual processor of the virtual computer; and wherein the host is further configured to send an interrupt request to the target virtual processor based on the identifier recorded in the storage area after the target virtual processor is swapped in and before the target virtual processor traps in.

3. The virtualized device according to claim 2, wherein:
the host is further configured to set the priority of the interrupt request and record the priority in the storage area accessible to both the host and the virtual computer; and the virtual computer is further configured to determine the target virtual processor based on the priority of the interrupt request and a priority of a virtual processor, wherein the priority of a virtual processor is stored in a storage area accessible to all virtual computers.

4. The virtualized device according to claim 3, wherein the virtual computer is further configured to:
search the storage area accessible to both the host and the virtual computer to obtain the interrupt request, based on the identifier of the interrupt request;

compare the priority of the interrupt request with priorities of all the in-service virtual processors; and determine any one or more of the one or more other virtual processors as the target virtual processor when the priorities of all the in-service virtual processors are higher than or equal to the priority of the interrupt request, or determine a virtual processor with a highest priority among the one or more other virtual processors as the target virtual processor when a priority of one or more in-service virtual processors is lower than the priority of the interrupt request.

5. The virtualized device according to claim 4, wherein when a priority of one or more in-service virtual processors is lower than the priority of the received interrupt request, the virtual computer is further configured to:

determine a virtual processor with a lowest priority among all the in-service virtual processors as the transit virtual processor; and send an IPI request to the transit virtual processor, the IPI interrupt request carrying an identifier of the target virtual processor and the transit virtual processor traps out after receiving the IPI request; and wherein the host is further configured to swap out the transit virtual processor and swap in the target virtual processor.

6. The virtualized device according to claim 2, wherein:
when the processing entity of the received interrupt request is the one or more other virtual processors and none of the one or more other virtual processors is in service, the virtual computer is further configured to:

send an identifier of the target virtual processor to the host, and trap out, wherein the target virtual processor is any one of the one or more other virtual processors or a virtual processor with a highest priority of the one or more other virtual processors; and the host is further configured to swap out the current virtual processor of the virtual computer and swap in the target virtual processor based on the identifier of the target virtual processor.

7. The virtualized device according to claim 1, wherein the hardware layer comprises an interrupt controller;

wherein the interrupt controller is configured to send an interrupt request to a corresponding physical processor based on interrupt affinity, wherein the interrupt affinity comprises a correspondence between an interrupt request and a physical processor;

wherein the virtual computer is further configured to receive the interrupt request from the interrupt controller; and wherein the host is further configured to configure the interrupt affinity of the interrupt controller.

8. The virtualized device according to claim 7, wherein the host is further configured to:
establish, in the interrupt affinity, a correspondence between a physical processor that is to run a swapped-in virtual processor and all interrupt requests whose processing entity comprises the virtual processor after the virtual processor is swapped in and before the virtual processor traps in.

9. An interrupt request processing method in a virtualized device comprising a processor, the method comprising:
configuring, by the processor in a host mode, a register of the processor to enable the processor to receive an interrupt request from other hardware of the virtualized device when running a virtual processor that runs in a guest mode; and performing, by the processor in the guest mode:
receiving an interrupt request from the other hardware;
determining a processing entity of the interrupt request based on information; and
based on determining that the processing entity of the received interrupt request comprises a virtual processor currently running on the processor, invoking, based on the information, an interrupt service routine corresponding to the interrupt request to process the interrupt request, the information comprising a correspondence between the interrupt request, the processing entity, and the interrupt service routine;

configuring, by the processor in the host mode, the virtual processor that is to run on the processor to be able to operate a physical interrupt controller of the virtualized device;

based on the processing entity of the interrupt request being another virtual processor and the another virtual processor is in service, the method further comprises performing, by the processor in the guest mode:
operating the physical interrupt controller to send an inter-processor interrupt (IPI) request to the another virtual processor, the IPI request carrying an identifier of the interrupt request, and the another virtual processor does not comprise the virtual processor currently running on the processor; and
based on no other virtual processors being in service, the method further comprises performing, by the processor in the guest mode:
recording the interrupt request in a storage area sharable with all the other virtual processors, wherein in response to a priority of the interrupt request being lower than or equal to priorities of all in-service virtual processors, only the identifier of the interrupt request is recorded without targeting a specific virtual processor;
determining a transit virtual processor from the other virtual processors; and
sending an IPI interrupt request to the transit virtual processor, whereby the transit virtual processor traps out; and
performing, by the processor in the host mode swapping in one of the other virtual processors corresponding to the received interrupt request for processing the interrupt request.

10. The method according to claim 9, further comprising:
configuring, by the processor in the host mode, an interrupt affinity of an interrupt controller of the virtualized device, the interrupt affinity comprising a correspondence between an identifier of an interrupt request and an identifier of a processor; and
wherein the receiving, by the processor, an interrupt request from hardware comprises receiving, by the processor, the interrupt request that is sent by the interrupt controller to the processor based on the interrupt affinity.

11. The method according to claim 10, wherein the configuring interrupt affinity of an interrupt controller comprises establishing, by the processor, a correspondence between the processor and all interrupt requests whose processing entity comprises a virtual processor in the interrupt affinity after the processor swaps in the virtual processor in the host mode.

12. The method according to claim 10, further comprising:
when the processing entity of the received interrupt request is one or more other virtual processors,
determining, by the processor in the guest mode, a target virtual processor from the one or more other virtual processors and recording an identifier of the interrupt request in a storage area that is accessible to the processor in both the guest mode and the host mode, wherein the one or more other virtual processors do not comprise the virtual processor currently running on the processor; and
sending, by the processor in the host mode, an interrupt request to the target virtual processor based on the identifier recorded in the storage area after the target virtual processor is swapped in and before the target virtual processor traps in.

13. The method according to claim 12, further comprising:
setting, by the processor in the host mode, the priority of the interrupt request, and recording the priority in the storage area that is accessible to the processor in both the host mode and the guest mode; and
wherein the determining a target virtual processor from the one or more other virtual processors comprises determining, by the processor in the guest mode, the target virtual processor based on the priority of the interrupt request and a priority of a virtual processor, wherein the priority of the virtual processor is stored in a storage area accessible to all virtual processors.

14. The method according to claim 12, wherein when the processing entity of the received interrupt request is the one or more other virtual processors, the method further comprises:
injecting, by the processor in the guest mode, an identifier of the target virtual processor;
exiting, by the processor, the guest mode, and entering the host mode, wherein the target virtual processor is any one of the one or more other virtual processors or a virtual processor with a highest priority in the one or more other virtual processors; and
swapping out, by the processor in the host mode, a virtual processor running on the processor and swapping in the target virtual processor based on the identifier of the target virtual processor.

15. The method according to claim 9, further comprising:
modifying, by the processor in the host mode, the information to add a correspondence between an identifier of an interrupt request, a processing entity of the interrupt request, and an interrupt service routine, wherein the information is stored in the storage area that is accessible to the processor in both the host mode and the guest mode; and
determining the processing entity of the received interrupt request and the interrupt service routine based on the information, comprising:
accessing, by the processor in the guest mode, the information, and determining, based on the identifier carried in the interrupt request, the processing entity of the interrupt request and the interrupt service routine corresponding to the interrupt request.

16. A non-volatile readable storage medium, configured to store computer-readable instructions when performed by a processor cause the processor to perform:
configuring, by the processor in a host mode, a register of the processor to enable the processor to receive an interrupt request from other hardware of the virtualized device when running a virtual processor that runs in a guest mode; and
performing, by the processor in the guest mode:
receiving an interrupt request from the other hardware;
determining a processing entity of the interrupt request based on information; and
based on determining that the processing entity of the received interrupt request comprises a virtual processor currently running on the processor, invoking, based on the information, an interrupt service routine corresponding to the interrupt request to process the interrupt request, the information comprising a correspondence between the interrupt request, the processing entity, and the interrupt service routine;
configuring, by the processor in the host mode, the virtual processor that is to run on the processor to be able to operate a physical interrupt controller of the virtualized device;

based on the processing entity of the interrupt request being another virtual processor and the another virtual processor is in service, the method further comprises performing, by the processor in the guest mode:

operating the physical interrupt controller to send an inter-processor interrupt (IPI) request to the another virtual processor, the IPI request carrying an identifier of the interrupt request, and the another virtual processor does not comprise the virtual processor currently running on the processor; and based on no other virtual processors being in service, the method further comprises performing, by the processor in the guest mode:

recording the interrupt request in a storage area sharable with all the other virtual processors, wherein in response to a priority of the interrupt request being lower than or equal to priorities of all in-service virtual processors, only the identifier of the interrupt request is recorded without targeting a specific virtual processor;

determining a transit virtual processor from the other virtual processors; and sending an IPI interrupt request to the transit virtual processor, whereby the transit virtual processor traps out; and performing, by the processor in the host mode swapping in one of the other virtual processors corresponding to the received interrupt request for processing the interrupt request.

17. The non-volatile readable storage medium according to claim 16, wherein the processor further performs:

configuring, by the processor in the host mode, an interrupt affinity of an interrupt controller of the virtualized device, the interrupt affinity comprising a correspondence between an identifier of an interrupt request and an identifier of a processor; and wherein the receiving, by the processor, an interrupt request from hardware comprises receiving, by the processor, the interrupt request that is sent by the interrupt controller to the processor based on the interrupt affinity.

* * * * *